(12) United States Patent (10) Patent No.: US 12,700,182 B2

Sayed et al. (45) Date of Patent: Aug. 4, 2026

(54) ENDOLUMINAL OBJECT CHARACTERIZATION USING 3D-RECONSTRUCTION

(71) Applicant: AURIS HEALTH, INC., Santa Clara, CA (US)

(72) Inventors: Saif Iftekar Sayed, Foster City, CA (US); Austin Jun Shin, Mountain View, CA (US); Elif Ayvali, Redwood, CA (US)

(73) Assignee: Auris Health, Inc., Santa Clara, CA (US)

( * ) Notice: Subject to any disclaimer, the term of this patent is extended or adjusted under 35 U.S.C. 154(b) by 186 days.

(21) Appl. No.: 18/669,804

(22) Filed: May 21, 2024

(65) Prior Publication Data

US 2025/0363740 A1 Nov. 27, 2025

(51) Int. Cl.
| | |
|---|---|
| *G06T 17/20* | (2006.01) |
| *G06T 7/00* | (2017.01) |
| *G06T 7/10* | (2017.01) |
| *G06T 7/246* | (2017.01) |
| *G06T 7/62* | (2017.01) |
| *G06T 7/70* | (2017.01) |
| *G06V 10/25* | (2022.01) |

(52) U.S. Cl.
CPC ............ *G06T 17/20* (2013.01); *G06T 7/0012* (2013.01); *G06T 7/10* (2017.01); *G06T 7/246* (2017.01); *G06T 7/62* (2017.01); *G06T 7/70* (2017.01); *G06V 10/25* (2022.01); *G06T 2207/30084* (2013.01); *G06T 2207/30241* (2013.01)

(58) Field of Classification Search
CPC ....... G06T 17/20; G06T 17/00; G06T 17/005; G06T 15/00; G06T 15/04; G06T 15/08; G06T 7/0012; G06T 7/10; G06T 7/246; G06T 7/62; G06T 7/70; G06T 2207/30084; G06T 2207/30241; G06T 2210/41; G06T 2219/2016; G06T 7/579; G06T 19/20; G06V 10/25
See application file for complete search history.

(56) References Cited

U.S. PATENT DOCUMENTS

| | | | | |
|---|---|---|---|---|
| 10,716,626 B2 * | 7/2020 | Liang | ............... | A61B 17/22004 |
| 11,302,435 B2 * | 4/2022 | Long | ..................... | G16H 30/20 |

(Continued)

OTHER PUBLICATIONS

DeTone, D., Malisiewicz, T., & Rabinovich, A. (2018). Superpoint: Self-supervised interest point detection and description. In Proceedings of the IEEE conference on computer vision and pattern recognition workshops (pp. 337-349).

(Continued)

*Primary Examiner* — Vijay Shankar
(74) *Attorney, Agent, or Firm* — Paradice & Li LLP

(57) ABSTRACT

The present disclosure provides for determination of object characteristics/properties based at least in part on images captured from within a subject. The object characteristics/properties can include, without limitations, size, weight, and/or shape of the object. An object depicted in the images may be identified and may be reconstructed in three-dimensional (3D) space as a volumetric representation (e.g., a 3D reconstruction of the object). The object characteristics/properties may be estimated based at least in part on the volumetric representation. In some embodiments, a scale associated with the volumetric representation may be determined and applied to the volumetric representation.

19 Claims, 12 Drawing Sheets

(56) References Cited

U.S. PATENT DOCUMENTS

| | | | | |
|---|---|---|---|---|
| 11,602,372 | B2 * | 3/2023 | Plewe | A61B 17/3403 |
| 11,830,604 | B2 * | 11/2023 | Long | G16H 30/20 |
| 12,059,126 | B2 * | 8/2024 | Tatsuta | A61B 1/00009 |
| 12,220,150 | B2 * | 2/2025 | Plewe | A61B 17/3403 |
| 12,462,573 | B1 * | 11/2025 | Joshi | G06V 10/25 |
| 2016/0374760 | A1 | 12/2016 | Liang et al. | |
| 2019/0204069 | A1 | 7/2019 | Tatsuta et al. | |
| 2022/0189610 | A1 | 6/2022 | Long et al. | |
| 2023/0094574 | A1 | 3/2023 | Plewe et al. | |
| 2025/0371758 | A1 * | 12/2025 | Andrew | G06T 12/10 |
| 2026/0017799 | A1 * | 1/2026 | Zhang | G06T 3/40 |

OTHER PUBLICATIONS

Liu, X., Zheng, Y., Killeen, B., Ishii, M., Hager, G. D., Taylor, R. H., & Unberath, M. (2020). Extremely dense point correspondences using a learned feature descriptor. In Proceedings of the IEEE/CVF conference on computer vision and pattern recognition (pp. 4847-4856).

Sarlin, P. E., DeTone, D., Malisiewicz, T., & Rabinovich, A. (2020). Superglue: Learning feature matching with graph neural networks. In Proceedings of the IEEE/CVF conference on computer vision and pattern recognition (pp. 4938-4947).

Teed, Z., & Deng, J. (2020). Raft: Recurrent all-pairs field transforms for optical flow. In Computer Vision—ECCV 2020: 16th European Conference, Glasgow, UK, Aug. 23-28, 2020, Proceedings, Part II 16 (pp. 1-17). Springer International Publishing.

Tan, H. et al., "Assessment of Three-Dimensional Reconstruction in Percutaneous Nephrolithotomy for Complex Renal Calculi Treatment", Frontiers in Surgery, 2021, vol. 8, Article No. 701207, pp. 1-7 p. 2, PCNL Preparation.

Notification, Search Report, and Written Opinion from PCT Application No. PCT/IB2025/054685, dated Aug. 12, 2025, 9 pages.

* cited by examiner

Figure 2:
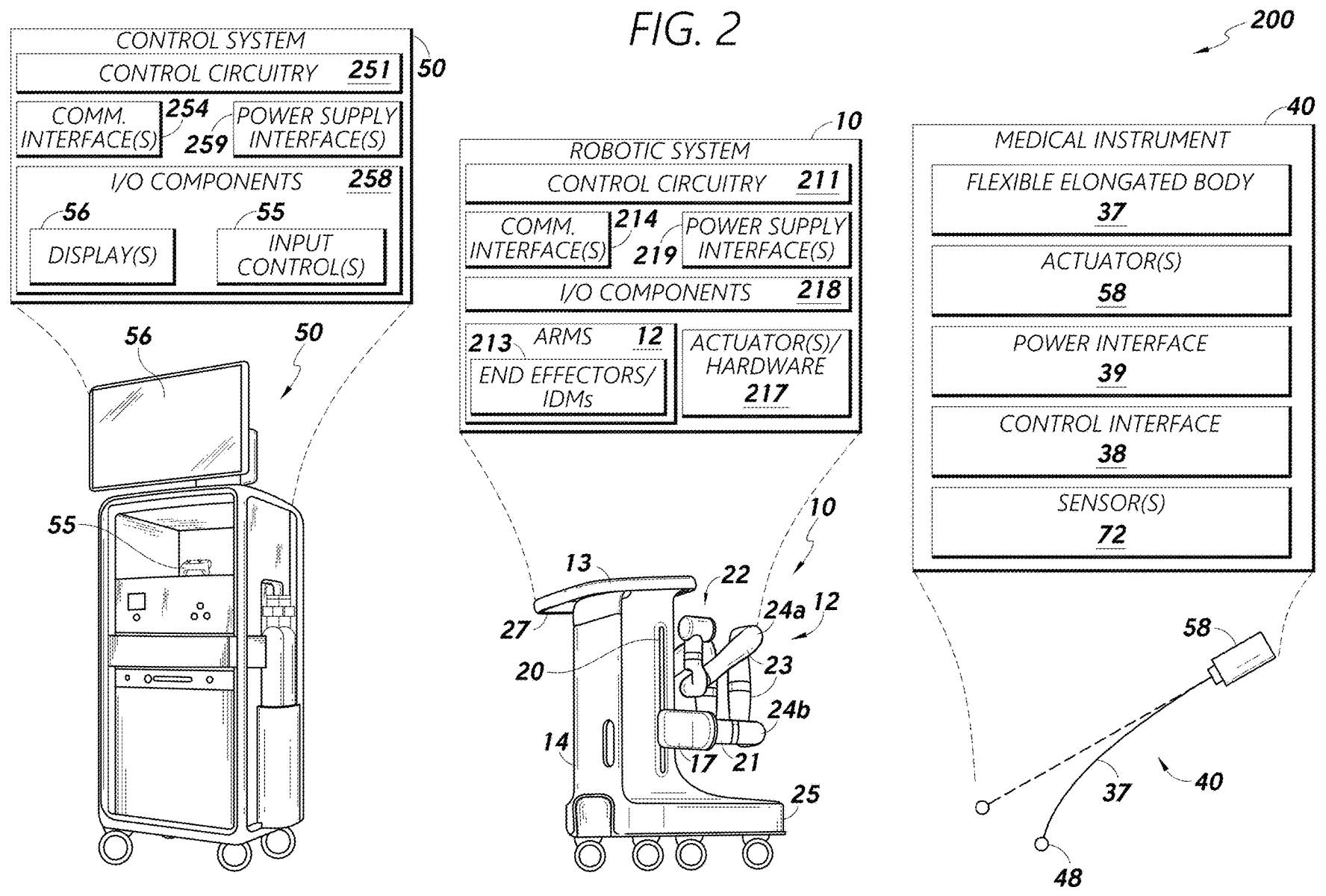

MEDICAL INSTRUMENT 40

FLEXIBLE ELONGATED BODY 37

ACTUATOR(S) 58

POWER INTERFACE 39

CONTROL INTERFACE 38

SENSOR(S) 72

58   40   37   48

ROBOTIC SYSTEM 10

CONTROL CIRCUITRY 211

POWER SUPPLY INTERFACE(S) 219

COMM. INTERFACE(S) 214

I/O COMPONENTS 218

ACTUATOR(S)/ HARDWARE 217

ARMS 12 213

END EFFECTORS/ IDMs

10

24a 12   23   24b   25

22   17 21 21

13   27   20   14

CONTROL SYSTEM 50

CONTROL CIRCUITRY 251

POWER SUPPLY INTERFACE(S) 259

COMM. INTERFACE(S) 254

I/O COMPONENTS 258

INPUT CONTROL(S) 55

DISPLAY(S) 56

50

56   55

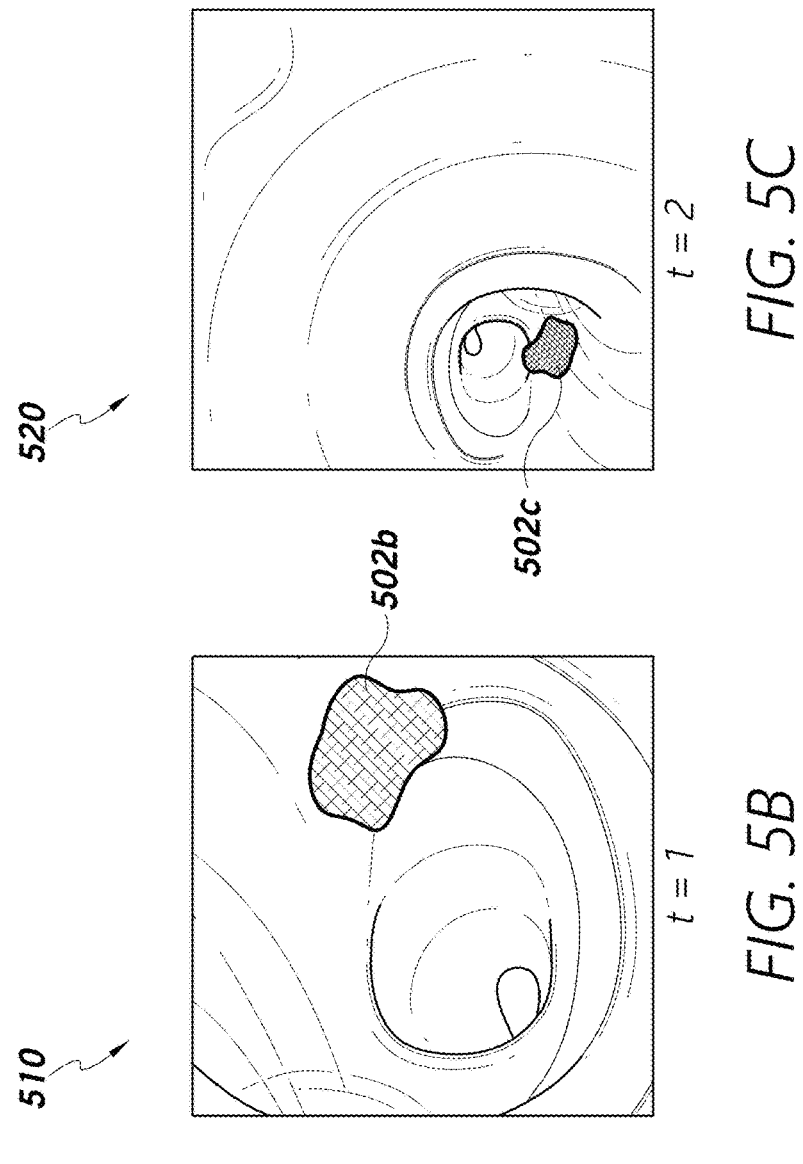
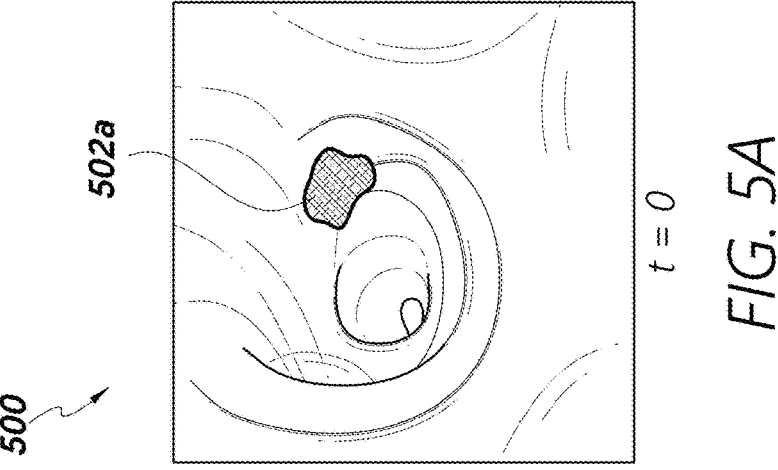
*FIG. 5A*      *FIG. 5B*      *FIG. 5C*

750

0   1   2   3   4   5 *mm*

700

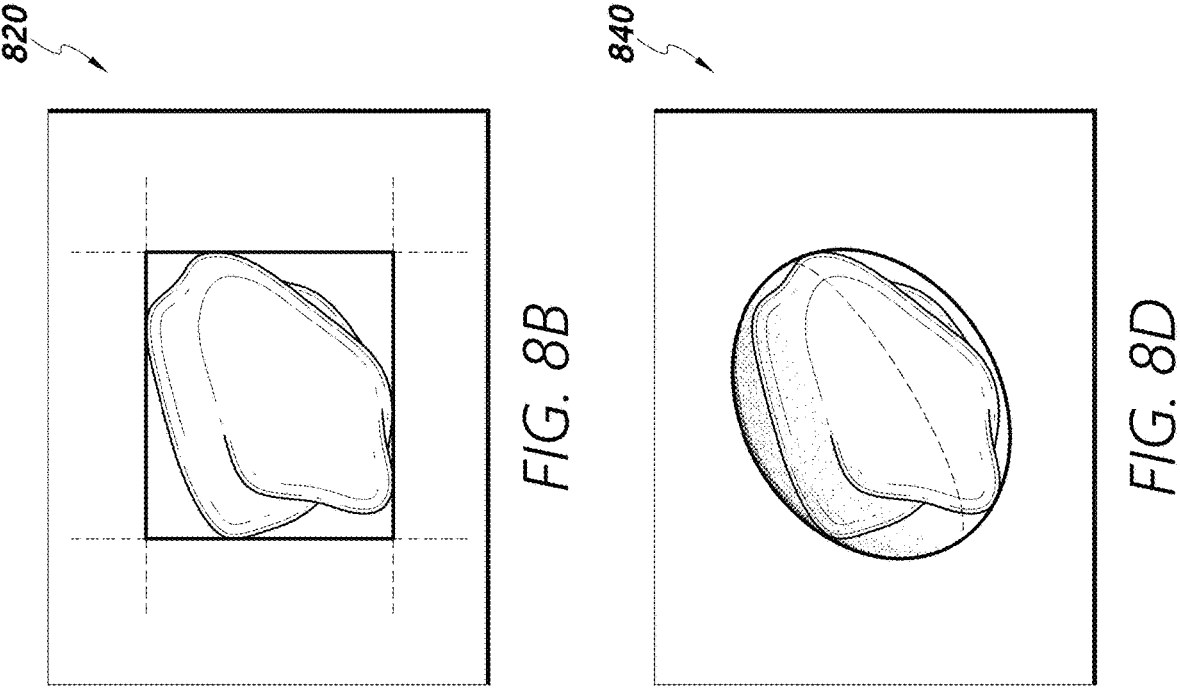
FIG. 8B
FIG. 8D
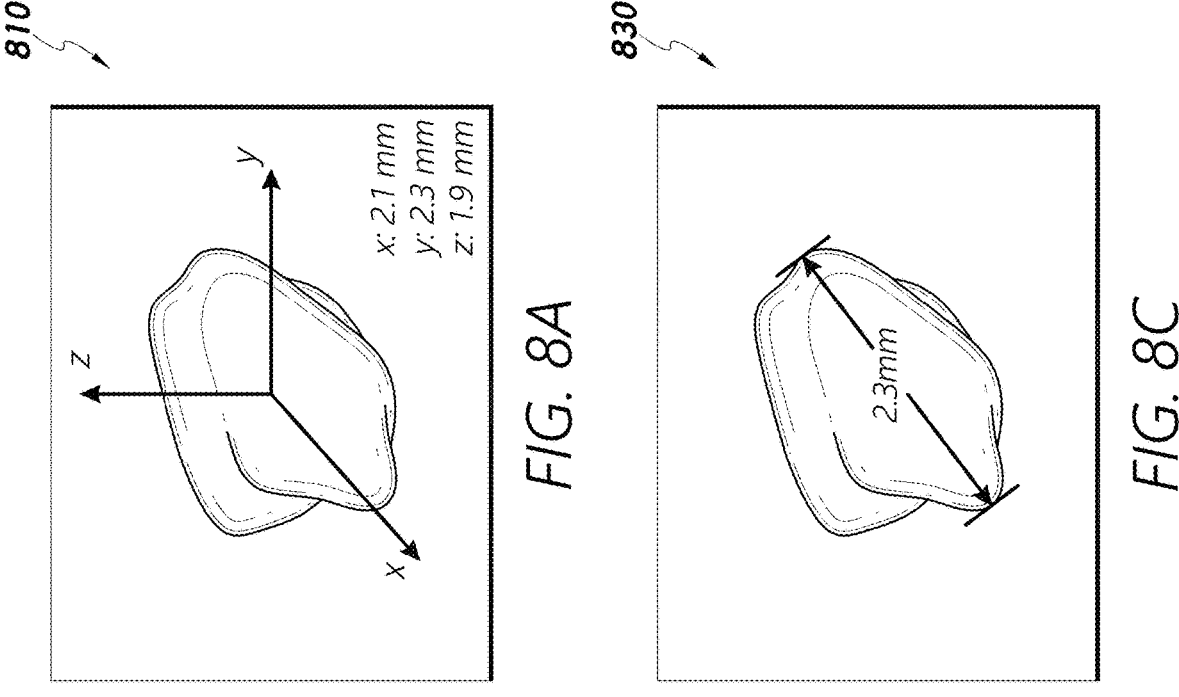
FIG. 8A
FIG. 8C

950

| OUTPUT VARIABLE |
| --- |
| OBJECT SIZE |
| OBJECT BOUNDING BOX |
| OBJECT MIN / MAX |
| OBJECT CAPSULE BASKET SIZE |
| SCENE MESH |

| INPUT VARIABLE |
| --- |
| SCOPE POSITION |
| SCOPE QUATERNIONS |
| SCOPE IMAGE SEQUENCES |
| SCOPE INTRINSIC MATRIX |
| HAND-EYE CALIBRATION MATRIX |
| START & END TIME |

FIG. 9A

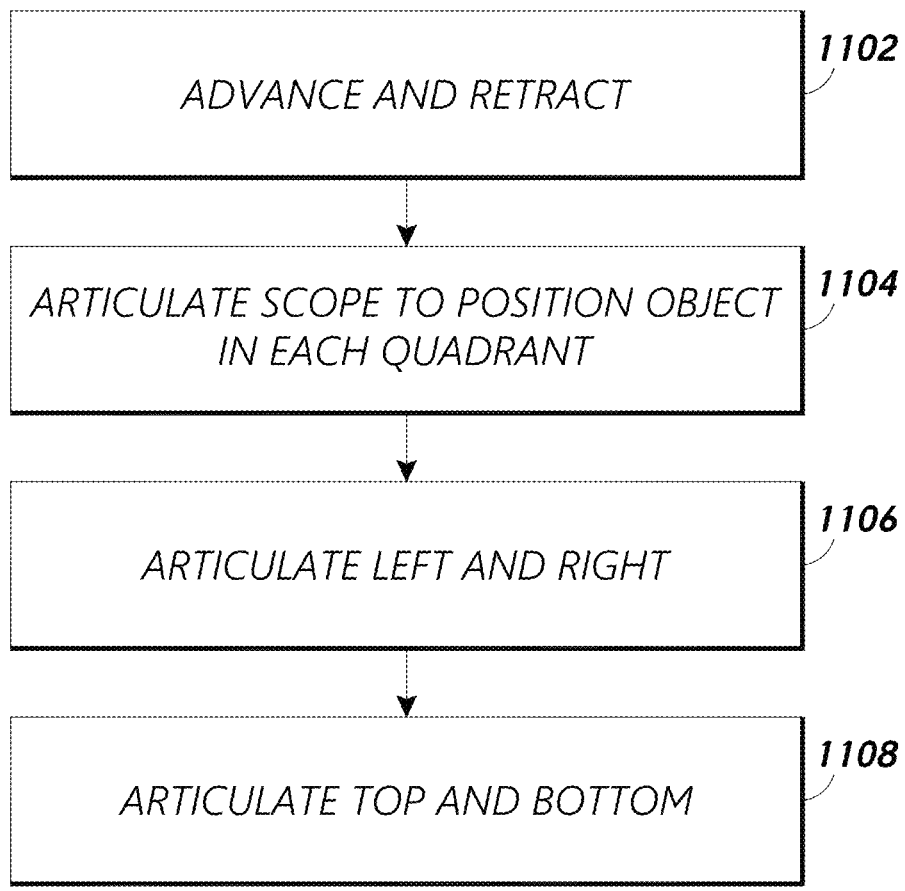
DATA COLLECTION WORKFLOW
ADVANCE AND RETRACT — 1102
ARTICULATE SCOPE TO POSITION OBJECT IN EACH QUADRANT — 1104
ARTICULATE LEFT AND RIGHT — 1106
ARTICULATE TOP AND BOTTOM — 1108
*FIG. 11*

1200

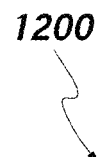

OBJECT SIZING WORKFLOW

ACCESS IMAGE DATA OF IMAGES CAPTURED BY ELONGATED BODY COMPRISING IMAGING SENSOR CONFIGURED TO CAPTURE IMAGES OF OBJECT　1202

GENERATE POSE DATA CORRESPONDING TO IMAGE DATA　1204

BASED AT LEAST IN PART ON IMAGE DATA AND POSE DATA, RECONSTRUCT OBJECT IN THREE-DIMENSIONAL (3D) SPACE　1206

DETERMINE SCALE TO BE APPLIED TO OBJECT RECONSTRUCTED IN 3D SPACE　1208

BASED AT LEAST IN PART ON SCALE AND OBJECT RECONSTRUCTED IN THE 3D SPACE, ESTIMATE SIZE OF OBJECT　1210

FIG. 12

ENDOLUMINAL OBJECT CHARACTERIZATION USING 3D-RECONSTRUCTION

BACKGROUND

Field

The present disclosure relates generally to the medical field, and specifically to characterizing an object within a subject.

Description of Related Art

Accurate object characterization can help facilitate medical procedures performed within a subject's body. For instance, in ureteroscopy performed to remove kidney stones, accurate size estimation and/or accurate shape estimation of a kidney stone may help avoid avulsion of the ureter by breaking the stone before removal. Conventional external imaging techniques like fluoroscopy may not readily capture objects. For example, endoscopic imaging techniques provide two-dimensional (2D) images that are often occluded, shadowed, or otherwise difficult to measure.

SUMMARY

Described herein are systems, devices, and methods to determine characteristics/properties of an object such as size of an object located within a subject's body. The characterization may be performed within a lumen based on images captured by an imaging device positioned proximate a distal end of an endoscope. For example, the object may be a kidney stone located within a ureter and characterization can involve size or shape estimation of the kidney stone. Real-time characterization of the object can help address discrepancies that may arise between preoperative characterization and endoluminal characterization, which may improve safety of medical procedures and expedite performance thereof.

In some aspects, the techniques described herein relate to a system for determining a property of an object, the system including: at least one computer-readable memory having stored thereon executable instructions; and one or more processors in communication with the at least one computer-readable memory and configured to execute the instructions to cause the system to: access image data of images of the object captured by an imaging device proximate a distal end of an elongate body; access pose data of the distal end corresponding to the image data; generate a three-dimensional (3D) reconstruction of the object based at least in part on the image data and the pose data; determine a scale to be applied to the 3D reconstruction; and based at least in part on the scale and the 3D reconstruction, estimate the property of the object.

In some aspects, the techniques described herein relate to a system, wherein the property is a size property.

In some aspects, the techniques described herein relate to a system, wherein the image data includes image frames, and wherein generating the 3D reconstruction of the object includes: generating segmentation masks for the image frames.

In some aspects, the techniques described herein relate to a system, wherein accessing the pose data of the distal end corresponding to the image data includes: estimating a trajectory of the imaging device over time based at least in part on identification of one or more features in a first image frame and corresponding features in a second frame subsequent to the first image frame.

In some aspects, the techniques described herein relate to a system, wherein the estimating the trajectory of the imaging device includes: generating a first segmentation mask for the first image frame and a second segmentation mask for the second image frame, the first segmentation mask including the one or more features and the second segmentation mask including the corresponding features; and tracking the one or more features and the corresponding features inside the segmentation masks.

In some aspects, the techniques described herein relate to a system, wherein accessing the pose data of the distal end corresponding to the image data includes: generating depth maps from the image data; and estimating a trajectory of the imaging device over time based at least in part on photometric tracking on the depth maps.

In some aspects, the techniques described herein relate to a system, wherein the photometric tracking is based at least in part on keyframe-based photometric error.

In some aspects, the techniques described herein relate to a system, wherein generating the 3D reconstruction of the object includes: performing a volume fusion based at least in part on at least one of segmentation masks, depth maps, or an estimated trajectory of the imaging device over time; and generating a first 3D mesh of the object based at least in part on the segmentation masks.

In some aspects, the techniques described herein relate to a system, wherein generating the 3D reconstruction of the object further includes: generating a second 3D mesh of a scene based at least in part on the estimated trajectory and the depth maps.

In some aspects, the techniques described herein relate to a system, wherein the one or more processors is further configured to execute the instructions to cause the system to determine a relative movement between the first 3D mesh of the object and the second 3D mesh of the scene, wherein the relative movement indicates anatomical motion or scope motion.

In some aspects, the techniques described herein relate to a system, wherein the volume fusion is based at least in part on at least one of a Truncated Signed Distance Field representation or surfel representation.

In some aspects, the techniques described herein relate to a system, wherein accessing pose data of the distal end includes: accessing electromagnetic (EM) data generated by an EM sensor proximate the distal end of the elongate body; and determining a transformation between corresponding coordinate frames of the EM sensor and the imaging device.

In some aspects, the techniques described herein relate to a system, wherein determining the scale to be applied to the 3D reconstruction includes: estimating a first trajectory of the imaging device over time based at least in part on photometric tracking, the first trajectory in an imaging device coordinates; determining a second trajectory of the EM sensor, the second trajectory in an EM sensor coordinates; and determining the scale based at least in part on the first trajectory, the second trajectory, and the transformation between the EM sensor and the imaging device.

In some aspects, the techniques described herein relate to a system, wherein estimating the property of the object includes: generating a bounding geometry that encompasses 3D point clouds of the 3D reconstruction; and multiplying the bounding geometry with the scale to determine object dimensions.

In some aspects, the techniques described herein relate to a system, wherein the bounding geometry is an ellipsoid and the object dimensions are represented in minimum volume covering the ellipsoid.

In some aspects, the techniques described herein relate to a system, wherein estimating the property of the object includes: determining two pixels having the farthest distance apart in an image frame of the image data; tracking the two pixels in at least one subsequent image frame following the image frame; performing triangulation to determine a 3D distance corresponding to the two pixels; and determining the maximum dimension of the object.

In some aspects, the techniques described herein relate to a system, wherein accessing the pose data of the distal end corresponding to the image data includes: estimating poses corresponding to the images based at least in part on a kinematic model and robot data.

In some aspects, the techniques described herein relate to a system, wherein the object is at least one of a kidney stone, a medical tool, or an anatomical feature.

In some aspects, the techniques described herein relate to a system for generating a three-dimensional (3D) reconstruction of an object, the system including: an imaging device proximate a distal end of an elongate body, the imaging device configured to capture images of the object; a robotic system configured to control the elongate body; and control circuitry configured to: access image data of the images; generate depth maps from the image data; estimate a trajectory of the imaging device over time based at least in part on photometric tracking on the depth maps; and generate the 3D reconstruction of the object based at least in part on the image data and the trajectory.

In some aspects, the techniques described herein relate to a system for determining a property of an object, the system including: at least one computer-readable memory having stored thereon executable instructions; and one or more processors in communication with the at least one computer-readable memory and configured to execute the instructions to cause the system to: access a three-dimensional (3D) representation of the object; determine a first trajectory of an imaging device over a time period using photometric tracking; determine a second trajectory of a position sensor over the time period; determine a scale to be applied to the 3D representation based at least in part on the first trajectory and the second trajectory; and estimate the property of the object based at least in part on the scale and the 3D representation.

For purposes of summarizing the disclosure, certain aspects, advantages and novel features have been described. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes and should in no way be interpreted as limiting the scope of the inventions. In addition, various features of different disclosed embodiments can be combined to form additional embodiments, which are part of this disclosure. Throughout the drawings, reference numbers may be reused to indicate correspondence between reference elements.

FIG. 2 illustrates a schematic view of different components of the medical system of FIG. 1, in accordance with one or more embodiments.

FIGS. 5A-5C illustrates example images of an object captured at multiple camera poses, in accordance with one or more embodiments.

FIGS. 8A-8D illustrate example object sizing techniques, in accordance with one or more embodiments.

FIGS. 9A and 9B illustrate example input variables and output variables, in accordance with one or more embodiments.

FIG. 11 illustrates a flow diagram illustrating a data collection process for collecting image data, in accordance with one or more embodiments.

FIG. 12 illustrates a flow diagram illustrating an object size estimation process, in accordance with one or more embodiments.

DETAILED DESCRIPTION

Figure 1:
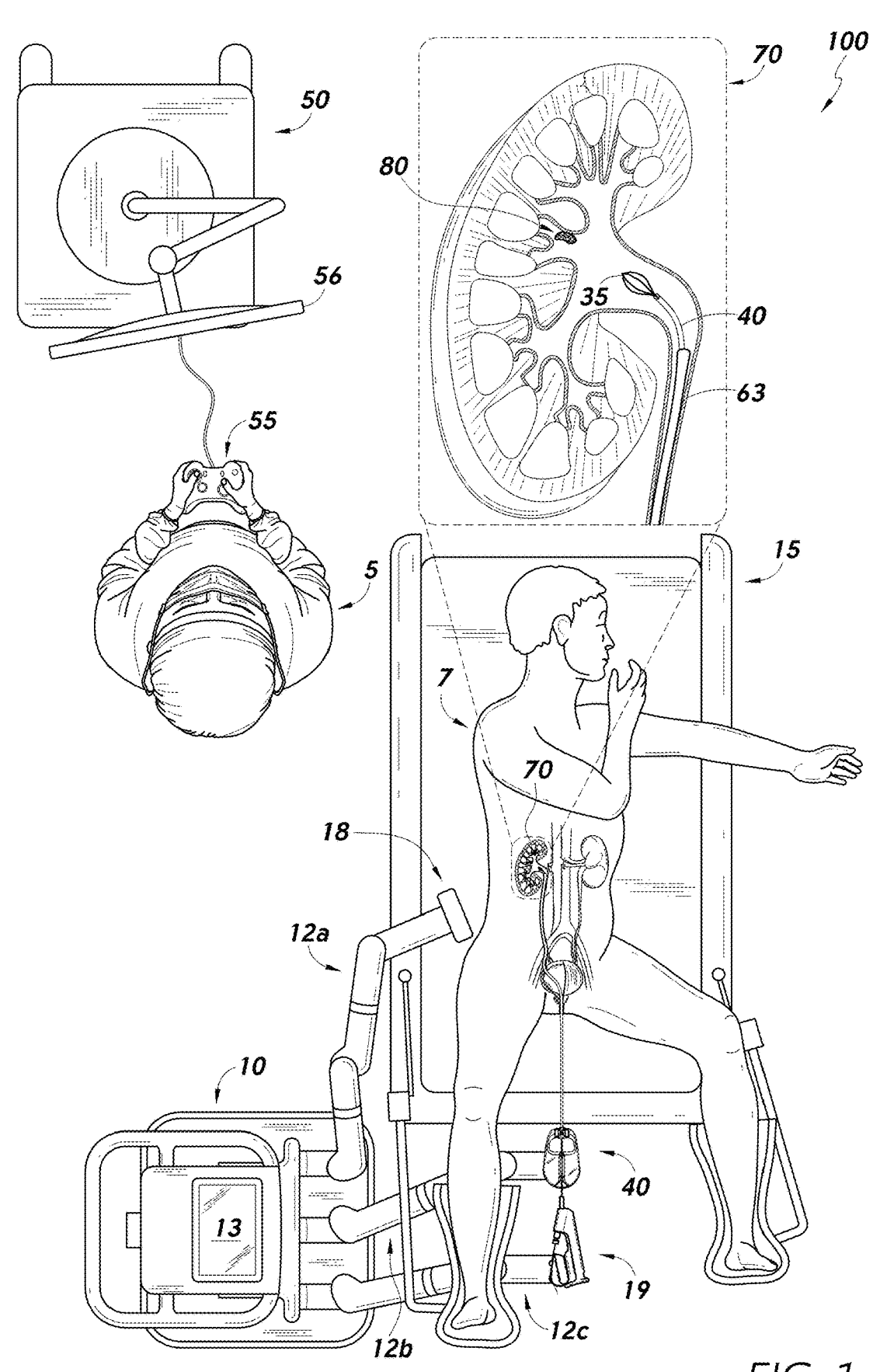
FIG. 1 illustrates an example medical system, in accordance with one or more examples.

The headings provided herein are for convenience only and do not necessarily affect the scope or meaning of the claimed invention. Although certain preferred embodiments and examples are disclosed below, inventive subject matter extends beyond the specifically disclosed embodiments to other alternative embodiments and/or uses and to modifications and equivalents thereof. Thus, the scope of the claims that may arise herefrom is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Although certain spatially relative terms, such as "outer," "inner," "upper," "lower," "below," "above," "vertical," "horizontal," "top," "bottom," "lateral," "upwardly," "side," and similar terms, are used herein to describe a spatial relationship of one device/element or anatomical structure to another device/element or anatomical structure, it is understood that these terms are used herein for ease of description to describe the positional relationship between element(s)/structures(s), such as with respect to the illustrated orientations of the drawings. It should be understood that spatially relative terms are intended to encompass different orientations of the element(s)/structures(s), in use or operation, in addition to the orientations depicted in the drawings. For example, an element/structure described as "above" another element/structure may represent a position that is below or beside such other element/structure with respect to alternate orientations of a subject or element/structure, and vice-versa. It should be understood that spatially relative terms, including those listed above, may be understood relative to a respective illustrated orientation of a referenced figure.

Certain reference numbers are re-used across different figures of the figure set of the present disclosure as a matter of convenience for devices, components, systems, features, and/or modules having features that may be similar in one or more respects. However, with respect to any of the embodiments disclosed herein, re-use of common reference numbers in the drawings does not necessarily indicate that such features, devices, components, or modules are identical or similar. Rather, one having ordinary skill in the art may be informed by context with respect to the degree to which usage of common reference numbers can imply similarity between referenced subject matter. Use of a particular reference number in the context of the description of a particular figure can be understood to relate to the identified device, component, aspect, feature, module, or system in that particular figure, and not necessarily to any devices, components, aspects, features, modules, or systems identified by the same reference number in another figure. Furthermore, aspects of separate figures identified with common reference numbers can be interpreted to share characteristics or to be entirely independent of one another. In some contexts, features associated with separate figures that are identified by common reference numbers are not related and/or similar with respect to at least certain aspects.

Overview

The present disclosure provides systems, devices, and methods for determining characteristics/properties of an object such as size and geometry of an object within a subject. As examples, the object may be one or more kidney stones, nodules, polyps, or any other anatomical features within a patient's anatomical structure such as a kidney, ureter, lung, lumen, or luminal network. The object may also include a medical tool or any portion(s) thereof. Various medical procedures may involve preoperative case planning during which an object of interest is characterized. For example, in ureteroscopy to remove kidney stones, preoperative case planning can involve kidney stone size estimation using external viewing techniques like fluoroscopy. While such estimation during preoperative case planning may provide helpful information, intraoperative assessment may reveal discrepancies between actual object size and the object size estimated preoperatively. These discrepancies can complicate the medical procedure. For example, the actual size of the stone may be larger than the estimated size and too large to pass through the ureter.

Aspects of the present disclosure may be used for object characterization based on images captured from within a subject. An object depicted in the images may be identified and may be reconstructed in three-dimensional (3D) space as a volumetric representation (e.g., a 3D reconstruction of the object). Size, shape, geometry, and other characteristics/properties of the object may be estimated based on the volumetric representation. In some embodiments, a scale associated with the volumetric representation may be determined and applied to the volumetric representation.

The object characterization of the present disclosure may be conducted during a medical procedure, intraoperatively in real-time, or substantially in real-time, to address potential complications caused by discrepancies between pre-procedure and intra-procedure object estimations. Intraoperative identification of objects larger than a lumen can help to reduce the likelihood of the object getting stuck in the lumen, thereby avoiding potential injury or damage to surrounding tissue. For example, during a kidney stone removal procedure, if the volumetric representation of a kidney stone reconstructed using the techniques disclosed in the present disclosure indicates that the actual stone size is larger than the urinary tract, an additional procedure to fragment the stone may be performed prior to removal. Another example, the volumetric representation of a nodule under treatment may indicate the size of the nodule is larger than that estimated for case planning, thus medicant dosage may be adjusted to a more appropriate level. Yet another example, the volumetric representation of an object may be periodically assessed to determine effects of treatment (e.g., injection of medicant into or in proximity to a nodule, lasing of a kidney stone, removal of a polyp) for further adjustment to case plan.

Medical System

Various aspects of the present disclosure described herein may be integrated into a robotically enabled/assisted medical system, including a surgical robotic system (robotic system for short), capable of performing a variety of medical procedures, including both minimally invasive, such as laparoscopy, and non-invasive, such as endoscopy, procedures. Among endoscopy procedures, the robotically enabled medical system may be capable of performing bronchoscopy, ureteroscopy, gastroscopy, etc.

In addition to performing the breadth of procedures, the robotically enabled medical system may provide additional benefits, such as enhanced imaging and guidance to assist the medical professional. Additionally, the robotically enabled medical system may provide the medical professional with the ability to perform the procedure from an ergonomic position without the need for awkward arm motions and positions. Still further, the robotically enabled medical system may provide the medical professional with the ability to perform the procedure with improved ease of use such that one or more of the instruments of the robotically enabled medical system may be controlled by a single operator.

FIG. 1 shows an example medical system 100 that may be used for performing various procedures in accordance with aspects of the present disclosure. The medical system 100 may be used for, for example, endoscopic (e.g., ureteroscopic) procedures. The principles disclosed herein may be implemented in any type of endoscopic (e.g., bronchial, gastrointestinal, etc.) and/or percutaneous procedure.

The medical system 100 can include a robotic system 10 (e.g., a mobile robotic cart as shown, a table-based system with integrated robotic arms, etc.) that is configured to engage with and/or control one or more medical instruments 40 (e.g., a surgical tool or instrument such as a scope, a basketing system, etc.) via one or more robotic arms 12 to perform a direct-entry procedure on a subject 7 (e.g., a patient, a test subject, a simulation model, etc.). The term "subject" is used herein to refer to live patient as well as any subjects to which the present disclosure may be applicable. For example, the "subject" may refer to subjects including physical anatomic models (e.g., anatomical education model, anatomical model, medical education anatomy model, etc.) used in dry runs, models in computer simulations, or the like that covers non-live patients or subjects. The robotic system 10 may be given commands by a control system 50 which is responsive to manual input from an operator 5. In some versions, the control system 50 is configured to receive images and/or image data from the medical instrument 40 (e.g., a scope) representing internal anatomy of the subject 7 and can display images based thereon.

It should be understood that the direct-entry instruments operated through the robotic system 10 and the control system 50 may include any type of medical instrument or combination of instruments, including an endoscope (e.g., a ureteroscope), catheter (e.g., a steerable or non-steerable catheter), nephroscopes, laparoscope, basketing systems, and/or other types of medical instruments. The medical instruments disclosed herein may be configured to navigate within the human anatomy, such as within a natural orifice or lumen of the human anatomy. The terms "scope" and "endoscope" are used herein according to their broad and ordinary meanings, and may refer to any type of elongate (e.g., shaft-type) medical instrument having image generating, viewing, and/or capturing functionality and being configured to be introduced into any type of organ, cavity, lumen, chamber, or space of a body.

The medical instrument 40 has a flexible elongated body that has mechanical couplings which enable the elongated body to flex, bend, deflect or articulate to some angle, in response to an actuator (e.g., containing a motor) being energized in accordance with a command (also referred to as an input, which refers to (e.g., defines) a desired direction or a desired articulation angle, for example). An example of such a medical instrument is a flexible endoscope (or scope) that may be any type of elongated medical instrument having image generating, viewing, and/or capturing functionality and configured to be introduced into any type of organ, cavity, lumen, chamber, or space of a patient's body. A scope may include, for example, a ureteroscope (e.g., for accessing the urinary tract), a laparoscope, a nephroscope (e.g., for accessing the kidneys), a bronchoscope (e.g., for accessing an airway, such as the bronchus), a colonoscope (e.g., for accessing the colon), an arthroscope (e.g., for accessing a joint), a cystoscope (e.g., for accessing the bladder), colonoscope (e.g., for accessing the colon and/or rectum), borescope, and so on. The elongated body may comprise a flexible tube or shaft and may be dimensioned to be passed within an outer sheath, catheter, introducer, or other lumen-type device, or it may be used without such devices.

In an example use case, if the subject 7 has a kidney stone (or stone fragment) 80 located in a kidney 70, the operator 5 may perform a procedure to remove the stone 80 through a urinary tract 63 using a basket 35. In some embodiments, the operator 5 can interact with the control system 50 and/or the robotic system 10 to cause/control the robotic system 10 to advance and navigate the medical instrument 40 through calyx network of the kidney 70 to where the stone 80 is located. The control system 50 can provide information via the display(s) 56 that is associated with the medical instrument 40, such as real-time endoscopic images captured therewith, and/or other instruments of the system 100, to assist the operator 5 in navigating/controlling such instrumentation.

The medical system 100 shown as an example in the figures further includes a table 15, and an electromagnetic (EM) field generator 18. Table 15 is configured to hold the subject 7 for example as shown. EM field generator 18 may be held by one of the robotic arms (robotic arm 12a) of the robotic system 10, may be a stand-alone device, or may be integrated into the table 15. In some versions, the table has actuators which can change, for example the height and orientation of the table 15. The control system 50 may communicate with the table 15 to position the table 15 in a particular orientation or otherwise control the table 15.

As shown in FIG. 2, the control system 50 of the present example includes various input/output (I/O) components 258 configured to assist the operator 5 or others in performing a medical procedure. For example, the I/O components 258 may be configured to allow for user input to control/navigate the medical instrument 40) within the subject 7. I/O components 258 of the present example include a controller 55 that is configured to receive user input from the operator 5; and a display 56 that is configured to present certain information to assist the operator. Controller 55 may take any suitable form, including but not limited to one or more buttons, keys, joysticks, handheld controllers (e.g., video-game-type controllers), computer mice, trackpads, trackballs, control pads, and/or sensors (e.g., motion sensors or cameras) that capture hand gestures and finger gestures, touchscreens, etc.

The control system 50 of the present example includes a communication interface 254 that is operable to provide a communicative interface between control system 50 and robotic system 10, medical instrument 40, and/or other components. Communications via communication interface 254 may include data, commands, electrical power, and/or other forms of communication. Communication interface 254 may also be configured to provide communication via wire, wirelessly, and/or other modalities. Control system 50 also includes a power supply interface 259, which may receive power to drive control system 50 via wire, battery, and/or any other suitable kind of power source. A control circuitry 251 of the control system 50 may provide signal processing and execute control algorithms to achieve the functionality of the medical system 100 as described herein.

The control system 50 may also communicate with the robotic system 10 to receive pose data therefrom relating to the pose (e.g., position and/or orientation) of the distal end of the medical instrument flexible elongated body 37. Such pose data may be derived using one or more EM sensors that may be mounted to the flexible elongated body 37 of the medical instrument 40, and that interact with an EM field generated by the EM field generator 18. The control system 50 may communicate with the EM field generator 18 to control the generation of the EM field in an area around the subject 7. Other ways of detecting the pose (e.g., 3D position and/or orientation) of the distal end of the medical instrument 40 are possible, such as using an optical camera/imaging-based system.

As noted above and as shown in FIG. 1 and FIG. 2, the robotic system 10 includes robotic arms 12 that are configured to engage with and/or control the medical instrument 40 to perform one or more aspects of a procedure. It should be understood that a robotic arm 12 may be coupled to instruments that are different than those shown in FIG. 1;

and in some scenarios, one or more of the robotic arms 12 may not be utilized or coupled to a medical instrument. Each robotic arm 12 includes multiple arm segments 23 coupled to joints 24, which enable the attached medical instrument to have multiple degrees of movement/freedom. In the example of FIG. 1, the robotic system 10 is positioned proximate to the patient's legs and the robotic arms 12 are actuated to engage with and position the medical instrument 40 for access into an access opening of the subject 7. When the robotic system 10 is properly positioned, the medical instrument 40 may be inserted into the subject 7 robotically using the robotic arms 12, manually by the operator 5, or a combination thereof.

In the case of the medical instrument 40 being a scope, a scope-driver instrument coupling 11, or more generally an instrument device manipulator (IDM), may be attached to the distal end of one of the arms (robotic arm 12b) to facilitate robotic control/advancement of the scope, while an instrument coupling/manipulator 19 that is attached to another of the arms (robotic arm 12c) is configured to facilitate advancement and operation of a basketing device (not shown). The medical instrument 40 may include one or more working channels through which additional tools, such as lithotripters, basketing devices, forceps, etc., may be introduced into the treatment site.

The robotic system 10 may be coupled to any component of the medical system 100, such as the control system 50, the table 15, the EM field generator 18, the medical instrument 40, and/or any type of percutaneous-access instrument (e.g., needle, catheter, nephroscope, etc.). As noted above, robotic system 10 may be communicatively coupled with control system 50 via communication interfaces 214, 254. Robotic system 10 also includes a power supply interface 219, which may receive power to drive robotic system 10 via wire, battery, and/or any other suitable kind of power source. In addition, robotic system 10 one example includes various input/output (I/O) components 218 configured to assist the operator 5 or others in performing a medical procedure. Such I/O components 218 may include any of the various kinds of I/O components 258 described herein in the context of the control system 50. In addition, or in the alternative, I/O components 218 of robotic system 10 may take any suitable form (or may be omitted altogether).

Robotic system 10 of the present example generally includes a column 14, a base 25, and a console 13 at the top of the column 14. I/O components 218 may be positioned at the upper end of column 14. Console 13 also includes a handle 27 to assist with maneuvering and stabilizing the robotic system 10. The column 14 may include one or more arm supports 17 (also referred to as a "carriage") for supporting the deployment of the one or more robotic arms 12 (where three robotic arms 12a, 12b, 12c are shown in FIG. 1). The arm support 17 may include individually configurable arm mounts that rotate about a perpendicular axis to adjust the base of the robotic arms 12 for desired positioning relative to the patient. In some embodiments, the arm support 17 may be connected to the column 14 through slots 20 that are positioned on opposite sides of the column 14 to guide vertical translation of the arm support 17 along column 14. The robotic arms 12 of the present example generally comprise robotic arm bases 21 and end effectors 22, separated by a series of linking arm segments 23 that are connected by a series of joints 24, each joint comprising one or more independent actuators 217. Each actuator 217 may comprise an independently controllable motor.

The end effector of each of the robotic arms 12 may include an instrument device manipulator (IDM 213), which may be attached using a mechanism changer interface (MCI). The MCI may provide power and control interfaces (e.g., connectors to transfer pneumatic pressure, electrical power, electrical signals, and/or optical signals from the robotic arm 12) to the IDM 213. In some embodiments, the IDM 213 may be removed and replaced with a different type of IDM 213, depending on the type of the medical instrument 40 that is to be attached to the arm. Each type of IDM 213 may serve to manipulate a respective type of the medical instrument 40. In the case where the medical instrument is a scope, the IDM 213 may use any one or combination of techniques including, for example, direct drives, harmonic drives, geared drives, belts and pulleys, magnetic drives, and the like, to drive the flexible elongated body of the scope so that the distal end is positioned to some desired angle or bent in some desired direction. A second type of IDM 213 may manipulate a basketing system or a steerable catheter by driving the flexible elongated body of the catheter or basketing system so that the distal end is positioned at some angle. Another type of IDM 213 may be configured to hold the EM field generator 18.

The medical system 100 may include certain control circuitry configured to perform certain of the functionality described herein, including the control circuitry 211 of the robotic system 10 and the control circuitry 251 of the control system 50. That is, the control circuitry of the medical system 100 may be part of the robotic system 10, the control system 50, or some combination thereof. The term "control circuitry" is used herein according to its broad and ordinary meaning, and may refer to any collection of processors, processing circuitry, processing modules/units, chips, dies (e.g., semiconductor dies including come or more active and/or passive devices and/or connectivity circuitry), microprocessors, micro-controllers, digital signal processors, microcomputers, central processing units, field programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. Control circuitry referenced herein may further include one or more circuit substrates (e.g., printed circuit boards), conductive traces and vias, and/or mounting pads, connectors, and/or components. Control circuitry referenced herein may further comprise one or more storage devices, which may be embodied in a single memory device, a plurality of memory devices, and/or embedded circuitry of a device. Such data storage may comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware and/or software state machine, analog circuitry, digital circuitry, and/or logic circuitry, data storage device(s)/register(s) storing any associated operational instructions may be embedded within, or external to, the circuitry comprising the state machine, analog circuitry, digital circuitry, and/or logic circuitry.

The control circuitry 211, 251 may comprise computer-readable media storing, and/or configured to store, hard-coded and/or operational instructions corresponding to at least some of the steps and/or functions illustrated in one or more of the present figures and/or described herein. Such computer-readable media may be included in an article of manufacture in some instances. The control circuitry 211, 251 may be entirely locally maintained/disposed or may be remotely located at least in part (e.g., communicatively coupled indirectly via a local area network and/or a wide area network).

In some embodiments, for example, the operator 5 may provide input to the control system 50 and/or robotic system 10; and in response to such input, control signals may be sent to the robotic system 10 to manipulate the medical instrument 40. The control system 50 may include one or more display devices (e.g., a display 56) to provide various information regarding a procedure. For example, the display 56 may provide information regarding the medical instrument 40. In the case of a scope, the control system 50 may receive real-time images that are captured by the scope and display the real-time images via the display 56.

As shown in FIG. 2, there may be an imaging device 48 at the distal end of the flexible elongated body 37 which may be powered through a power interface 39 and/or controlled through a control interface 38, each or both of which may interface with a robotic arm/component of the robotic system 10. The medical instrument 40 may have one or more other sensors (sensor 72), such as pressure and/or other force-reading sensors, which may be configured to generate signals indicating forces experienced at or by one or more actuators (e.g., an actuator 58) and/or other couplings of the medical instrument 40.

Medical Instrument

Figure 3:
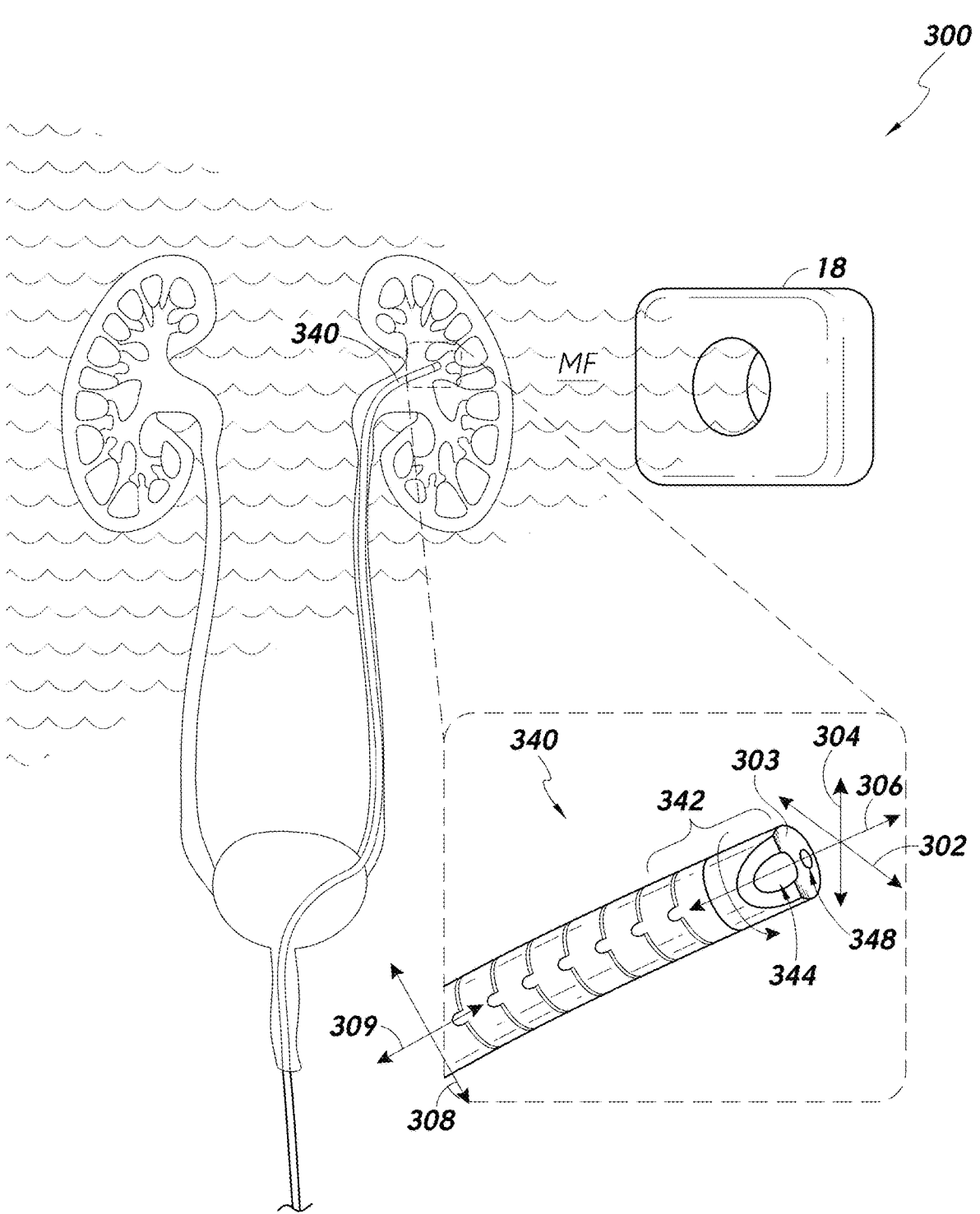
FIG. 3 illustrates enlarged views of other components of the medical system of FIG. 1, including a distal end of an example medical instrument, in accordance with one or more embodiments.

FIG. 3 shows an example of the medical instrument 40 described above, as a scope 340. Scope 340 of this example includes a working channel 344 that may be formed inside a flexible elongated body 37. The working channel 344 may serve for deploying therein a medical tool or a component of the medical instrument (e.g., a lithotripter, a basket 35, forceps, laser, or the like) or for performing irrigation and/or aspiration, out through a distal end 342 of the scope 340, into an operative region surrounding the distal end 342. The scope 340 and in particular the flexible elongated body 37 may be articulated, such as with respect to at least the distal end 342, so that the scope 340 and in particular its distal end can be steered within the human anatomy. In some embodiments, the scope 340 is configured to be articulated with, for example, five degrees of freedom, including XYZ coordinate movement, as well as pitch and yaw. In some embodiments, the scope 340 has six degrees of freedom, including X, Y, and Z positions, as well as pitch, tilt or roll, and yaw. Position sensors of the scope 340 may likewise have similar degrees of freedom with respect to the position information they produce or provide. As shown in FIG. 3, the deflection of the flexible elongated body 37 may be defined by the resulting angle that is formed between the distal end 342 and a longitudinal axis 306 of the flexible elongated body 37 when the latter is in an unbent state as shown. The longitudinal axis 306 is also referred to below as a "roll axis" of the scope 340.

In the present example, the scope 340 can accommodate wires and/or optical fibers to transfer signals to/from an optical assembly at the distal end 342. The optical assembly may include an imaging device 348 such as an optical camera. The imaging device 348 may be used to capture images of an internal anatomical space of the subject 7. The scope 340 may further be configured to accommodate optical fibers to carry light from proximately located light sources, such as light-emitting diodes, to the distal end 342. The distal end 342 may include ports for light sources to illuminate an anatomical space when using the imaging device 348. The imaging device 348 may comprise one or more optical components as needed to illuminate the field of view of the imaging device, e.g., an optical fiber, a fiber array, a lens, a light-emitting diode, etc. all of which may be housed at the distal end 342. The optical components of the imaging device 348 move along with, or as one with, the distal end 342, such that movement of the distal end 342 results in changes to the images that are being captured simultaneously by the imaging device 348.

To capture images at different orientations of the distal end 342, robotic system 10 may be configured to deflect the distal end 342 on a yaw axis 302, a pitch axis 304, or a roll axis that coincides with the longitudinal axis 306. This may be enabled by the flexible elongated body 37 which is an elongated body that could be elongated or translated in the longitudinal axis 306, an x-axis 308, or a y-axis 309. The scope 340 may include a reference structure (not shown) to calibrate the position of the scope 340. For example, the robotic system 10 and/or control system 50 may measure deflection or bending of the flexible elongated body 37 of the scope 340 relative to the reference structure. The reference structure may be located, for example, on a proximal end of the scope 340 and may include a key, slot, or flange.

In one instance, one of the robotic arms (e.g., robotic arm 12b) of the robotic system 10 may be configured/configurable to manipulate the scope 340 as described above. A scope-driver instrument coupling 11, or more broadly an instrument device manipulator (IDM), may be attached to the distal end of the robotic arm 12b. The IDM, and in this case the scope-driver instrument coupling 11, contains an actuator that becomes mechanically coupled to a transmission in the scope 340, when the scope 340 has been attached to the IDM, to facilitate robotic control/advancement of the bending of the scope 340. Such manipulation may be performed by energizing the actuator which actuates one or more of the elongated transmission elements in the scope 340, such as one or more pull wires (e.g., pull or push wires), cables, fibers, and/or flexible shafts. For example, the robotic arm 12 may be configured with to actuate multiple pull wires (not shown) coupled to the scope 340, which results in deflecting the distal end 342 to some desired angle or in some desired direction. Pull wires may include any suitable or desirable materials that have limited stretching characteristics, such as metallic and non-metallic materials such as stainless steel, Kevlar, tungsten, carbon fiber, and the like. In some embodiments, the scope 340 is configured to exhibit nonlinear behavior in response to the forces applied by the elongated transmission elements. The nonlinear behavior may be based on stiffness and compressibility of the scope 340, as well as variability in slack or stiffness between different members that make up the flexible elongated body 37.

In another embodiment of the medical instrument 40, still referring to FIG. 2, the actuator 58 which actuates the elongated transmission elements of the scope 340 (to result in bending of the flexible elongated body 37) is contained within a housing of the scope 340. In this embodiment, the command which is generated by the robotic system 10 to bend the flexible elongated body 37 may be translated into an actuator control signal that is signaled through the control interface 38, while the actuator 58 is powered through the power interface 39.

In some embodiments, the scope 340 includes at least one sensor 303 that is configured to generate, cause generation of, and/or send sensor position data to another device. The sensor position data can indicate a position and/or orientation of the scope 340, e.g., the distal end 342 thereof, and/or may be used to determine or infer a position/orientation of the scope 340. For example, the sensor 303 (sometimes referred to as a "position sensor") may include an electromagnetic (EM) sensor with a coil of conductive material or other form of an antenna that produces an output signal in the presence of an EM field (such as one produced by the EM field generator 18). In some versions, the position sensor is positioned on the distal end 342, while in other embodiments the sensor 303 is positioned at another location on the scope 340. As shown in the example of FIG. 3, EM field generator 18 is configured to broadcast a magnetic field (denoted "MF") that is detected by the sensor 303 being in this case an EM position sensor. The magnetic field induces small currents in coils of the EM position sensor, which may be analyzed by a digital processor to determine a distance and/or angle/orientation between the EM position sensor and the EM field generator 18, which is then interpreted by the processor to determine the 3D position of the distal end 342 and optionally the orientation of the imaging device 348. It should be understood that the sensor 303 and the associated 3D position tracking subsystem may be of another type, such as an optical marker as part of an optical 3D tracking subsystem, a shape sensing fiber, an accelerometer, a gyroscope, a satellite-based positioning sensor (e.g., a global positioning system (GPS) sensor), a radio-frequency transceiver, and so on. In the present example, the EM position sensor of scope 340 provides sensor data to control system 50, which is then used to determine a position and/or an orientation of the scope 340.

Object Size Estimation Pipeline

Figure 4:
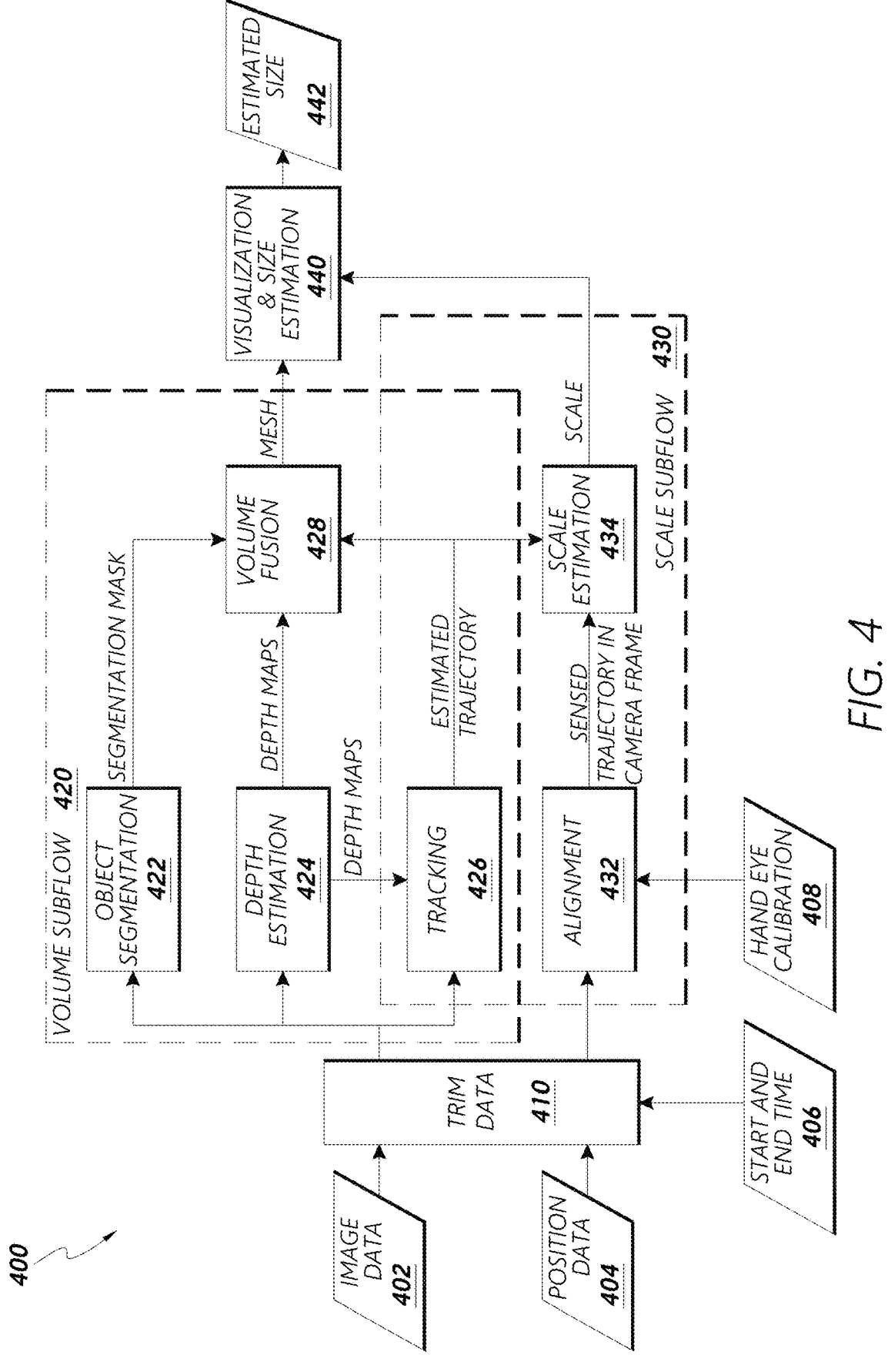
FIG. 4 illustrates an example block diagram of an object sizing pipeline, in accordance with one or more embodiments.

FIG. 4 illustrates an example block diagram of an object sizing pipeline 400, in accordance with one or more embodiments. The pipeline 400 of FIG. 4 visualizes stages or sequences of stages involved in the object sizing process. In particular, the pipeline 400 focuses on data flow and data processing aspects. An object sizing framework 602 of FIG. 6 visualizes various components, software and/or hardware, as distinct blocks based on their respective functionalities. It will be understood that the pipeline 400 and the object sizing framework 602 may complement or supplement one another.

At high level, the pipeline 400 estimates size of an object based on performance of two subflows: a volume subflow 420 and a scale subflow 430. The volume subflow 420 can involve reconstructing a volumetric representation. The scale subflow 430 can involve determining a scale for the volumetric representation. An object size in 3D may be estimated based on the volumetric representation and the scale. That is, the volumetric representation can be unitless and the scale can imbue the unitless volumetric representation with real-world measurement units such as, for example, millimeters.

As one type of input data, the pipeline 400 can involve accessing (e.g., receiving, retrieving, capturing, decompressing, etc.) image data 402. The image data 402 can correspond to images captured by an imaging device (e.g., the imaging device 348 of FIG. 3) which may include an optical camera, an infrared camera, a monocular camera, a stereoscopic camera, or the like. The images corresponding to the image data 402 may depict multiple views of an object of interest captured at multiple different angles. Where a monocular camera was employed, the images may be from a sequence of captured images. Where a stereoscopic camera, trinocular camera, or other multi-ocular cameras were employed, the images may be images captured at the same time.

As another type of input data, the pipeline 400 can involve accessing position data 404. The position data 404 may be acquired from an EM sensor (e.g., the sensor 303 of FIG. 3). It will be understood that the EM sensor are example sensors capable of providing position data and other types of sensors or position determination mechanisms may provide the position data 404. For example, the position data 404 may be provided by shape sensors or kinematic model in combination with a sequence of robot commands. In some embodiments, orientation data (not shown) may be provided in addition to, or as part of, the position data 404.

The pipeline 400 may be configured to estimate size of an object in real-time or offline. When in real-time, the image data 402 and position data 404 from the same time period of the image data 402 may be accessed from one or more data buffers as camera image stream and position stream are acquired. When offline, a trim data block 410 may access the image data 402 and position data 404 from one or more data stores, which may be temporally trimmed and synchronized at a trim data block 410.

At the trim data block 410, start and end time 406 may be provided as an input. The start and end time 406 may be received from an operator or automatically determined by the medical system 100. Such automatic determination of the start and end time 406 may be based on a first timestamp of initial identification time of the object in the image data 402 as the start time and termination time of continued identification of the object in the image data 402 as the end time.

The volume subflow 420 can identify various features within each image of the image data 402, identify correspondences between features of one image to features of another image, and quantify the different viewpoints such that corresponding camera poses (e.g., viewpoints) at which images were taken can be determined. Additionally, the volume subflow 420 can identify the object in images based on object recognition (e.g., segmentation) techniques and, based on the quantified camera poses and the identified objects, generate the volumetric representation using 2D-to-3D reconstruction techniques. In connection with performing above, the volume subflow 420 can include an object segmentation block 422, depth estimation block 424, and tracking block 426.

The volume subflow 420 is described in detail based on example images 500, 510, 520 of FIGS. 5A-5C captured with multiple camera poses where the example images 500, 510, 520 captures the same object 502 within the same luminal network with different views. Each of the example images are captured with its own camera pose. For example, assuming the example images were taken sequentially (e.g., at t=0, t=1, and t=2, where larger number indicates a timestamp later in time), a first image 500 was captured with a first camera pose, a second image 510 was captured with a second camera pose, and a third image 520 was captured with a third camera pose. The differences in distance to and direction in relation to the object 502 are caused by advancement/retraction and articulation of a distally positioned imaging sensor of an endoscope (e.g., the imaging device 348 positioned at the distal end 342 of the scope 340).

In the example images 500, 510, 520, the object 502 is a kidney stone to be removed in ureteroscopy. The kidney stone represents an example object and the use of an ureteroscope represents an example medical procedure but one skilled in the art would readily understand the present disclosure can apply to other objects and other medical procedures.

At object segmentation block 422, the object 502 may be identified and outlined from each of the images 500, 510, 520. In some embodiments, the object segmentation block 422 may involve labelling pixels or pixel equivalents as the object 502. The labelled pixels or pixel equivalents can form a segmentation mask that differentiates the object 502 from a surrounding scene (e.g., entire kidney or other anatomical/endoluminal locations) in each of the images 500, 510, 520. In some embodiments, one or more trained machine learning models may infer the segmentation masks. For example, a neural network of a machine learning model based on deep learning models and/or consistent with UNet architecture (e.g., Alb-UNet) may receive one or more frames of the image data 402 and can create a segmentation mask of the object 502 for every frame. The segmentation masks can be provided to volume fusion block 428.

At depth estimation block 424, depth maps may be generated for each of the images 500, 510, 520. The depth maps may be true depth maps reflecting actual distances measured with sensors, such as stereoscopic cameras, or pseudo-depth maps reflecting relative spatial relationships between each pixel for images taken with a monocular camera. In some embodiments, the generated depth maps may take forms of red green blue depth (RGBD) images that combine traditional color information with depth information for each pixel where brighter pixels are closer to the camera device and darker pixels are farther away from the camera device. In some embodiments, one or more trained machine learning models may infer the depth maps. For example, a machine learning model based on deep learning models (e.g., depth convolutional networks and/or Depth-Net) may receive one or more frames of the image data 402 and can create a depth map for every frame. The depth maps can be provided to the volume fusion block 428 and to the tracking block 426.

At tracking block 426, various sparse tracking or dense tracking techniques may be used to estimate a trajectory of camera motion (e.g., change in camera pose, relative camera motion, or visual odometry). Sparse tracking can involve identification of one or more features in an image frame and corresponding features in subsequent image frame. For example, the depth maps generated at the depth estimation block 424 may be analyzed for one or more features, such as maxima representing close points and minima representing far points. As another example, the features may be detected using Scale-Invariant Feature Transform (SIFT), Oriented FAST and Rotated BRIEF (ORB), or other feature detection algorithms. As yet another example, the features may be detected using SuperPoint, SuperGlue, or other sparse deep feature detections techniques. In some embodiments, the tracking block 426 may isolate the estimated trajectory of camera motion from anatomical motion, such as breathing. As examples, an object such as a kidney stone or the scope can move due to breathing when the object is supported by a tissue involved in the breathing or other bodily movements. Sparse deep features may provide more robust (e.g., easier to track or error-resistant) features to track. In some embodiments, decoupling optical flow (e.g., displacements/motions of corresponding pixels/features between consecutive frames of sequential images) caused by the anatomical motion and the camera motion may help isolation of pixels/features for use as the robust features for tracking. The tracking block 426 can estimate the trajectory based on tracking of the identified features across sequential images 500, 510, 520.

Dense tracking may involve photometric tracking. The photometric tracking can continuously monitor keyframe-based photometric error, which can be the difference in brightness or color between corresponding pixels in sequential depth maps, to estimate the trajectory. In some implementations, Gauss-Newton optimization may be used in estimation of the trajectory. The estimated trajectory can be provided to the volume fusion block 428.

It will be understood that some of the blocks described above and below may be executed out of order. For example, the pipeline 400 may perform the object segmentation block 422 first to differentiate the object 502 from its surrounding scene in the image data 402 and provide the resulting segmented images to the depth estimation block 424 and tracking block 426 for use in a first ordering of the blocks (i.e., segmentation block 422-depth estimation block 424-tracking block 426). Alternatively, the pipeline 400 may perform the depth estimation block 424 first, the object segmentation block 422 second, and use resulting segmentation masks (of the object 502, of its surrounding scene, or of the combination of both) in the tracking block 426 to generate masked photometric error in a second ordering of the blocks (i.e., depth estimation block 424-segmentation block 422-tracking block 426). Each different ordering may have its advantage and disadvantage. For instance, the second ordering of the blocks may advantageously reduce susceptibility to errors arising from tissue deformation but, when the object 502 takes a significant portion of the image data 402, it may leave too few pixels to track. Other variations in the ordering of the blocks are possible.

At volume fusion block 428, the volumetric representation may be generated using 2D-to-3D reconstruction techniques. the volumetric representation can be generated based on the depth maps from the depth estimation block 424 and the estimated trajectory (e.g., visual odometry) from the tracking block 426. In some embodiments, depth information from the depth maps are projected into the 3D space to generate a point cloud. For example, each pixel can be registered in the 3D space as a point based on the depth information from the depth maps for each image based on visual odometry associated with the image from the estimated trajectory for the point cloud. The point cloud, or a mesh generated based on the point cloud, may be used as the volumetric representation.

The volumetric representation reconstructed by the volume fusion block 428 and the volume subflow 420 may represent the shape, contours, features, or the like of the object 502 but may be unitless in virtual dimensions. That is, the volumetric representation may lack reference to a scale in the physical realm such that size of the object 502 may not be estimated in physical dimensions (e.g., millimeters).

The scale subflow 430 can determine the scale between the virtual dimensions and the physical dimensions. The scale subflow 430 can access synchronized position data 404 from the same time period of the image data 402. The position data 404 may be sensed or determined in a robotic frame (e.g., a robotic coordinate system), which may be different from a camera frame (e.g., a camera coordinate system) from which the image data 402 and its estimated trajectory are referenced. In some embodiments, the scale subflow 430 can align trajectories in the camera frame and the robotic frame and compute the scale based on a comparison of the two aligned trajectories.

At alignment block 432, the image data 402 or the position data 404 may be aligned with (e.g., translated into) the other frame based on a hand-eye calibration 408 (e.g., robot-camera calibration). In some embodiments, the hand-eye calibration 408 can take form of a matrix and the alignment involve application of the matrix. After the alignment, a sensed trajectory from the position data 404 can be in the same frame as the estimated trajectory (e.g., from the robotic frame to the camera frame or vice versa).

At scale estimation block 434, the estimated trajectory and the sensed trajectory can be compared to estimate the scale. The scale estimation works in part because the robotic frame from which the position data 404 was sensed has a known scale in the physical realm. Accordingly, the sensed trajectory is of the known scale. When both trajectories are in the same frame, a scale used to fit the estimated trajectory in virtual dimensions to the sensed trajectory associated with physical dimensions is the scale to be applied to the volumetric representation to estimate physical measurement of the volumetric representation. The estimated scale can be provided to visualization and size estimation block 440.

At visualization and size estimation block 440, the object 502 can be visualized (e.g., modeled) based on the volumetric representation and the scale. It is noted that the visualized object 502 is scaled and has defined physical dimensions. Size of the object 502 can be estimated by surveying the 3D representation of the object 502. The pipeline 400 can thus provide an estimated size 442 of the object 502.

It will be understood that depicted blocks in the pipeline 400 are exemplary and fewer or more blocks, as well as blocks organized in different orders, may be involved in the object size estimation.

Object Sizing Framework

Figure 6:
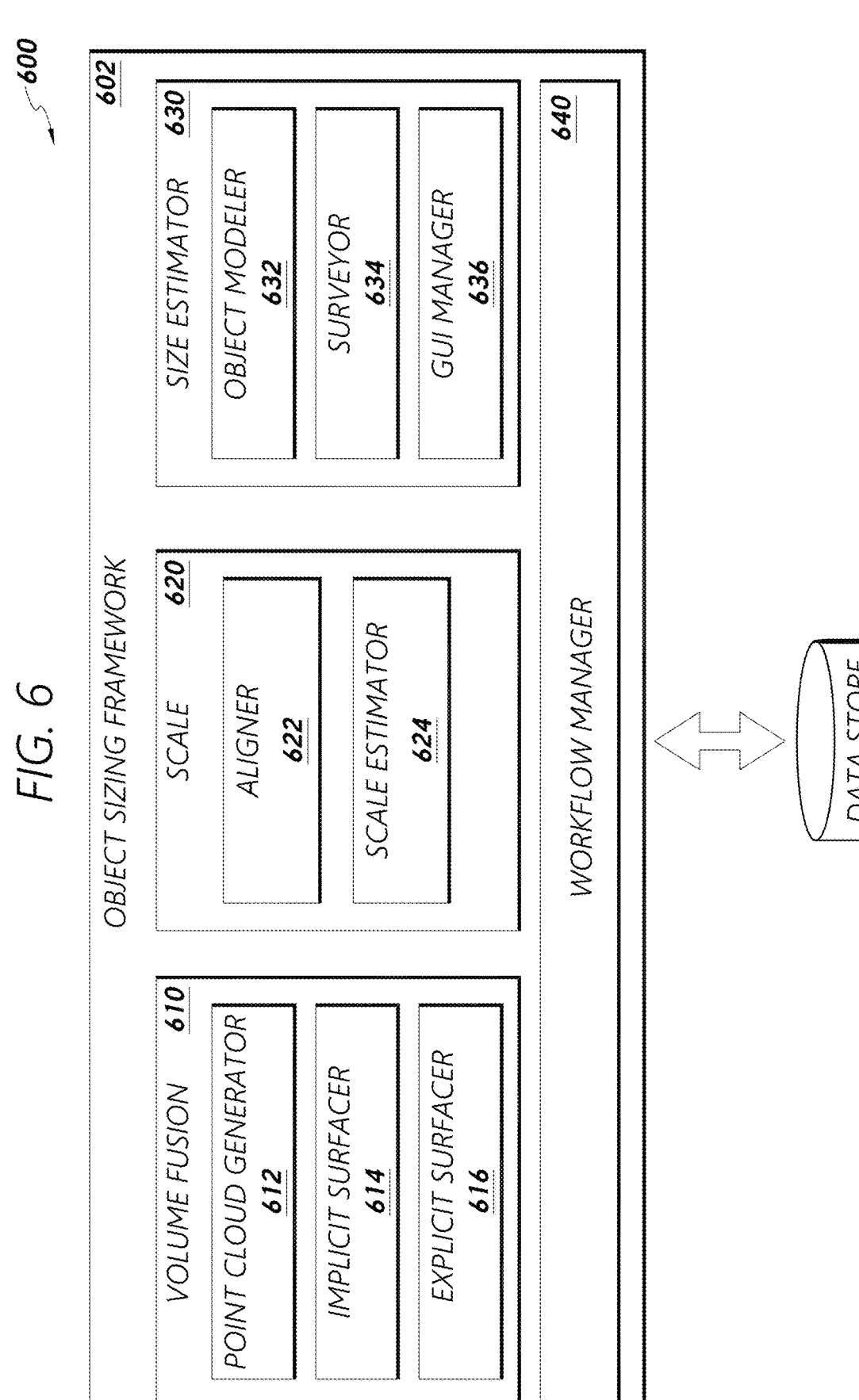
FIG. 6 illustrates an example system including an object sizing framework, in accordance with one or more embodiments.

FIG. 6 illustrates an example system 600 including an object sizing framework 602, in accordance with one or more embodiments. The object sizing framework 602 can be configured to reconstruct a volumetric representation of an object (e.g., the kidney stone of FIGS. 5A, 5B, and 5C) from a plurality of endoluminal images and estimate size of the object using the volumetric representation. For example, the object sizing framework 602 can generate a volumetric representation, determine a scale to be applied to the volumetric representation, estimate size of an object, and manage workflow for the object size estimation.

As shown, the object sizing framework 602 can include a volume fusion module 610, a scale module 620, an size estimator module 630, and a workflow manager 640. Each of the modules can implement functionalities in connection with certain aspects of the object size estimation pipeline 400 of FIG. 4. It should be noted that the components (e.g., modules) shown in this figure and all figures herein are exemplary only, and other implementations may include additional, fewer, integrated or different components. Some components may not be shown so as not to obscure relevant details. Furthermore, it will be understood that the architecture of the object sizing framework 602 is modular in design and performance may be improved by improving individual modules. For example, one can improve the volume fusion module 610, the scale module 620, or any component modules thereof for improved performance.

In some embodiments, the various modules and/or applications described herein can be implemented, in part or in whole, as software, hardware, or any combination thereof. In general, a module and/or an application, as discussed herein, can be associated with software, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a user or client computing device, on a network server or cloud servers (e.g., Software-as-a-Service (SaaS)), or a control circuitry (e.g., the control circuitry 211, 251 of FIG. 2). It should be understood that there can be many variations or other possibilities.

As shown with the example system 600, the object sizing framework 602 can be configured to communicate with one or more data stores 604. The data store 604 can be configured to store, maintain, and provide access to various types of data to support the functionality of the object sizing framework 602. For example, the data store 604 may store, maintain, and provide access to image data including video/vision data consistent with the image data 402 accessed in the object sizing pipeline 400 of FIG. 4. As another example, the data store 604 may store, maintain, and provide access to robot data and sensor data. The robot data can include robot command data, robot state data (e.g., articulation data, diagnostic data, etc.), and/or robot configuration data. The sensor data can include position data consistent with the position data 404 accessed in the object sizing pipeline 400 of FIG. 4. It is noted that some image data or position data may be real-time data in one or more data buffers and may be made available directly from the robotic medical system without having to access the data store 604.

In addition to the image data and the position data, the data store 604 may store, maintain, and provide access to supplementary data including procedure identifiers (e.g., phase, workflow, etc.), operation identifiers, subject identifier, metadata, attributes, system time and timestamps, relational database identifiers, and other information accessed by the object sizing framework 602. Additionally, the data store 604 may store, maintain, and provide access to any byproducts and outputs of the object sizing pipeline 400 of FIG. 4. For instance, point clouds generated from the volume fusion block 428, 3D reconstructions of objects or their surrounding scenes from the visualization and size estimation block 440, and/or physical measurements from the estimated size 442 may be stored and accessed from the data store 604.

The volume fusion module 610 can be configured to generate a volumetric representation (e.g., reconstruct a 3D model) of an object. As example volumetric representations, a point cloud or a mesh were described in relation to the volume fusion block 428 of FIG. 4 but other volumetric representations are also contemplated. The volume fusion module 610 can include any of a point cloud generator 612, an implicit surfacer 614, and/or an explicit surfacer 616 in connection with generating the volumetric representation.

The point cloud generator 612 can be configured to generate a 3D point cloud. Where some specialized 3D scanning hardware (e.g., including Light Detection and Ranging (LiDAR), structured light, or time-of-flight) information are available, the 3D point cloud may be generated based on the 3D scanning hardware information. Where a monocular vision data is available, the 3D point cloud may be generated based on pseudo-depth maps and visual odometry of the monocular vision data.

The implicit surfacer 614 can be configured to generate an implicit surface representation as another form of a volumetric representation. The implicit surface representation can define 3D objects with one or more mathematical functions. As an example technique, Truncated Signed Distance Field (TSDF) may be applied where multiple depth maps from different camera viewpoints are integrated and fused into a TSDF representation. For instance, the multiple pseudo-depth maps and visual odometry may be integrated and fused into a TSDF representation of an object, a surrounding scene, or both. Advantageously, the TSDF representation can be robust to noise and compact in comparison to the point clouds. In will be understood that a volumetric representation may be derived from another volumetric representation and vice versa. For example, a TSDF representation may be generated by performing 3D reconstruction on a 3D point cloud and a 3D point cloud may be generated by performing surface extraction on a TSDF representation. Techniques other than TSDF are contemplated.

The explicit surfacer 616 can be configured to generate an explicit surface representation as yet another form of a volumetric representation. The explicit surface representation can define 3D objects by directly defining geometry, for example, with vertices and faces defining 3D meshes. As an example technique for generating an explicit surface representation, the Marching Cubes algorithm can be used to extract a polygonal mesh based on a 3D point cloud or an implicit surface representation. In some embodiments, instead of a mesh, surfel representation may be used to represent and approximate surfaces using small, oriented disk primitives called "surfels." Each surfel can represent a small region of the surface and carries information about its properties such as position, orientation, color, texture, and reflectance. Advantageously, the explicit surface representation can be straightforward to render for display and can be readily texture-mapped. Techniques other than Marching Cubes or surfel representations are contemplated.

Figure 7B:
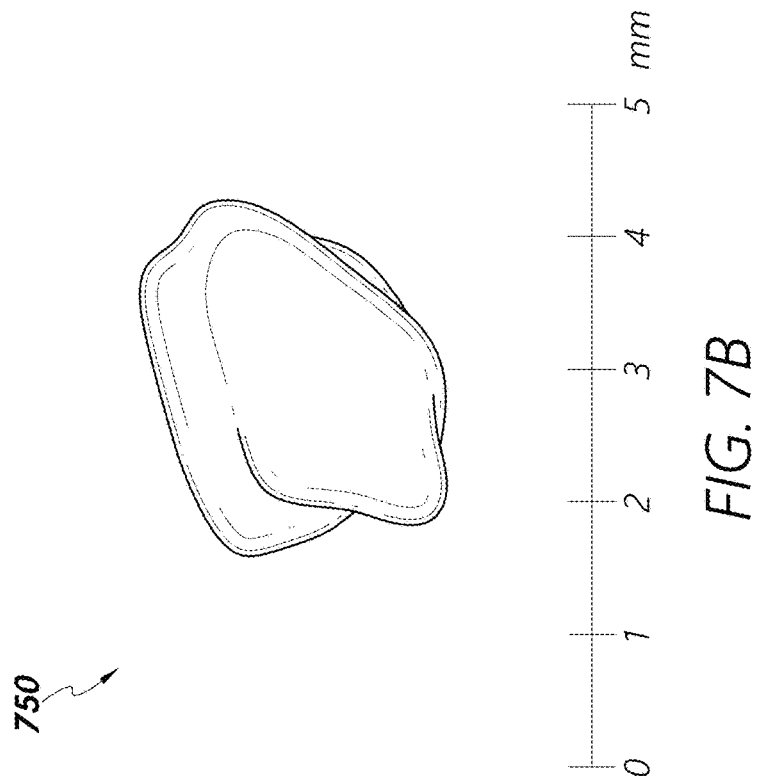
FIGS. 7A and 7B illustrate an example reconstructed scene and an example sized object, in accordance with one or more embodiments.
Figure 7A:
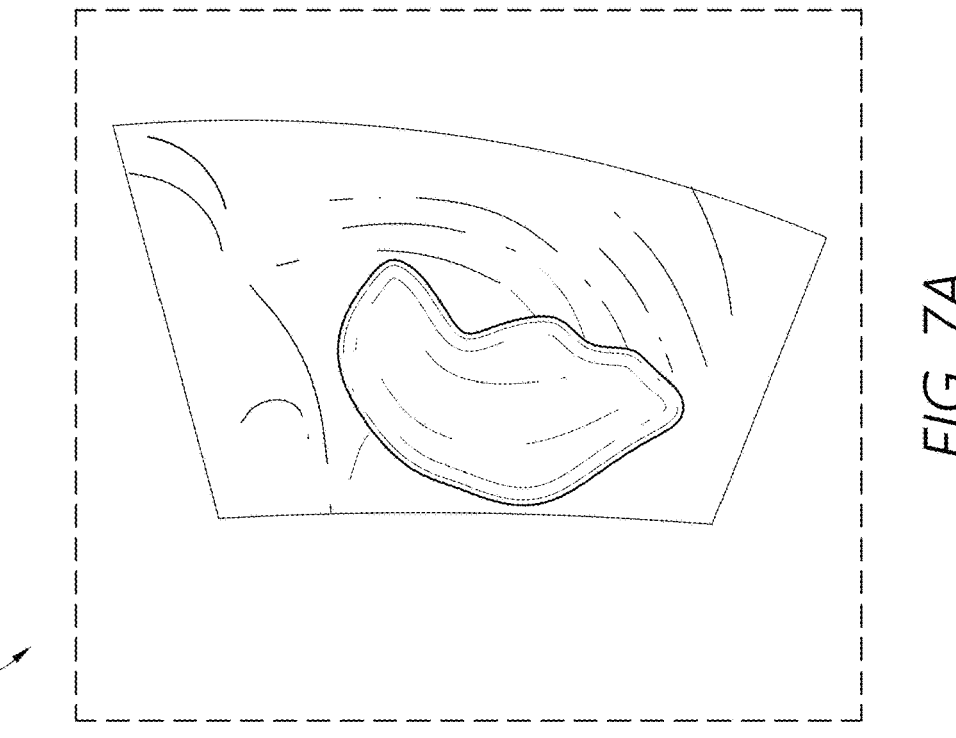

It will be understood that the volumetric representation generated by the volume fusion module 610 may be of an object, a surrounding scene, or both. For example, a first 3D reconstructed mesh may be of the scene and a second 3D reconstructed mesh may be of only the object. The segmentation masks generated by the object segmentation block 422 of FIG. 4 may be used to differentiate pixels corresponding to the object from pixels corresponding to the scene. FIG. 7A illustrates a first example volumetric reconstruction 700 of a kidney stone and its surroundings, which can be an output of the volume fusion module 610.

The scale module 620 can be configured to estimate a scale between the volumetric representation and true physical dimensions. The scale module 620 can include an aligner 622 and a scale estimator 624.

The aligner 622 can be configured to align an estimated trajectory to a sensed trajectory, for example, determined from the position data 404 of FIG. 4. The two trajectories may be aligned based on a hand-eye calibration matrix as described in relation to the alignment block 432 of FIG. 4. In some implementations, the shapes of the trajectories or features thereof may be compared for an alignment. For instance, terminal points, degrees of curvatures, or other features may be compared for the alignment.

The scale estimator 624 can be configured to estimate the scale based on the aligned trajectories. While the trajectories are aligned in their orientations, they may not overlap with each other. That is, the estimated trajectory may be in the camera frame and the sensed trajectory may be in the robotic frame, where only the robotic frame may correspond to known physical dimensions. The scale may be determined based on the following relationship:

$$\text{scale} = \frac{\sum\limits^{T} X_c^{em} * Y_c^{pred}}{\sum\limits^{T} Y_c^{pred2}}, \quad \begin{array}{l} Y_c^{pred}: \text{Predicted trajectory} \\ X^{em}: EM \text{ trajectory} \end{array}.$$

It will be understood that the above relationship is an example and specific implementation details and considerations might vary depending on the nature of trajectories, available data, and application requirements, taking into considerations of noise, outliers, and other sources of uncertainty.

In comparison with the pipeline 400 of FIG. 4, the volume fusion module 610 can correspond to the volume fusion block 428 and the scale module 620 can correspond to the scale estimation block 434. Accordingly, the scale estimated by the scale estimator 624 can provide physical dimensions to the volumetric representation reconstructed by the volume fusion module 610, as shown at the visualization and size estimation block 440. FIG. 7B illustrates a second example volumetric representation 750 of a kidney stone with its physical dimensions, in millimeters, determined based on the scale.

Referring back to the object sizing framework 602, the size estimator module 630 can be configured to estimate size of an object in physical dimensions (e.g., British, or the like). In some embodiments, the size estimator module 630 can be configured to render a 3D model the volumetric representation, survey the 3D model to facilitate size estimation, and manage interactions with the 3D model. In connection with the functionalities, the size estimator module 630 can include an object modeler 632, a surveyor 634, and a GUI manager 636.

The object modeler 632 can be configured to render the object, its surrounding scene, or both based on the volumetric representation. The 3D model can be rendered in real-life physical dimensions, likely in millimeters or in a more granular unit, based on any of the various volumetric representations (e.g., point cloud, implicit/explicit surface, etc.) and the scale. The 3D model can be readily presented to a display (e.g., the display 56 of FIG. 2), which will be described in greater detail in relation to FIG. 10.

The surveyor 634 can be configured to survey or analyze the 3D model rendered by the object modeler 632 for its various characteristics/properties. For example, the surveyor 634 can determine one or more principal axes of the 3D model, farthest points apart in the 3D model, closest points in the 3D model, shape of the 3D model, and various other characteristics/properties. Importantly, the surveyor 634 can estimate size of the object.

As the present disclosure contemplates objects having various complex shapes, size estimation of an object may involve multiple sizing techniques that provide multiple sizes or size-related metrics of the object. FIGS. 8A-8D illustrate few example sizing techniques but it will be understood that other techniques are possible. In FIG. 8A, a first size estimation 810 involves determining outermost points on X, Y, and Z axes. In FIG. 8B, a second size estimation 820 involves determining a bounding box that encompasses the 3D model. In FIG. 8C, a third size estimation 830 involves determining farthest points of the 3D model. In FIG. 8D, a fourth size estimation 840 involves determining a minimum geometric volume that envelopes the 3D model, such as the depicted ellipsoid. Any of the determined metrics may be used as size estimations alone or in combination.

In some embodiments, the surveyor 634 may be configured to estimate the size of the object based on any of the volumetric representation of the volume fusion module 610, without reconstructing a 3D model. For example, the surveyor 634 may perform size estimation based on a 3D point cloud and a corresponding scale. For instance, in a manner similar to the second size estimation 820, a bounding box that can encompass all point of the 3D point cloud representing can be found and multiplied by the corresponding scale to convert the unitless virtual dimensions of the bounding box into an actual physical dimensions in volumetric units (e.g., millimeter cubed).

In some other embodiments, the surveyor 634 may be configured to estimate the size of an object without reliance on a volumetric representation. For example, in a manner similar to the third size estimation 830, farthest points size estimation can provide the biggest dimension of the object by performing a workflow that (i) identifies two pixels in a frame of image data that are farthest apart, (ii) tracks the two points in subsequent frames, and (iii) triangulates to find a 3D distance between the two points. When the triangulation is performed for all frames, a maximum dimension of the object may be determined. Many variations are possible.

The GUI manager 636 can be configured to present the 3D model rendered by the object modeler 632. In some embodiments, the GUI manager 636 may provide various graphical user interface elements (e.g., graphical icons and visual indicators) such that the 3D model may be interacted with using the graphical user interface elements as well as interacted with the controller 55 of FIG. 2. Furthermore, the GUI manager 636 can be configured to present various metrics (e.g., object size estimation), events (e.g., prompts, warnings, state changes, etc.), or other relevant information. An example GUI interface will be described in greater detail in relation to FIG. 10.

The workflow manager 640 can be configured to streamline, control, and/or automate various tasks in a medical procedure. In particular, the workflow manager 640 may direct a data collection protocol that ensures adequate image variance for object size estimation. For instance, the workflow manager 640 can provide step-by-step navigation instructions such that the scope 340 can collect image data 402 that provide sufficient viewpoint (e.g., pose) variance for reconstruction of a 3D model of the object. In some embodiments, the workflow manager 640 may evaluate an image for their quality in connection with (i) determining the next instruction to provide, (ii) determining whether to skip one or more steps, (iii) determining whether to retake another image, and/or (iv) determining to terminate the data collection protocol. It will be understood that the workflow manager 640 may provide the instructions to the medical system 100 for autonomous data collection, to the operator 5 for manual data collection, or to both for semi-autonomous data collection (e.g., prompting user to approve each step). An example data collection protocol will be described in greater detail in relation to FIG. 11.

In some embodiments, the workflow manager 640 may automate certain tasks or portions of the medical procedure based on the estimated size of the object. For example, the workflow manager 640 may identify basket size for an object to be removed, laser fire duration, extraction speed, or the like based on the estimated size.

Input and Output Variables

FIGS. 9A and 9B illustrate example input variables 900 and output variables 950, respectively, in accordance with one or more embodiments. The input variables 900 can be provided to the pipeline 400 of FIG. 4 and/or the object sizing framework 602 of FIG. 6. Similarly, the output variables 950 can be generated from the pipeline 400 and/or the object sizing framework 602. In some embodiments, some or all of the input variables 900 and output variables 950 may be stored and accessed from the data store 604 of FIG. 6.

The input variables 900 can include, without limitations, a scope position, a scope quaternion, a scope image sequence, a scope intrinsic matrix, a hand-eye calibration matrix, start and end times, or the like. The scope position may be a 3D scope position in the robotic frame (e.g., global frame or reference frame) described in relation to FIG. 4. The scope quaternion can be a four-dimensional (4D) scope position in the robotic frame. The scope position and the scope quaternion can be the position data 404 of FIG. 4. The scope image sequence can be the image data 402 of FIG. 4 relating to captured vision data or video. In some implementations, the scope image sequence can be T×R×C, where T is a number of frames and image data is represented as R×C matrix.

The scope intrinsic matrix can be a device/instrument specific matrix for a scope 340 that accounts for variability in the scope 340. That is, the scope intrinsic matrix can be used for the scope 340 to provide position data 404. The hand-eye calibration matrix and the start and end time were described in the pipeline 400 of FIG. 4 as the hand-eye calibration 408 and the start and end time 406.

The output variables 950 can include, without limitations, an object size, an object bounding box, an object minimum/maximum, an object capsule basket size, a scene mesh, or the like. The object size can be an estimated object size in X, Y, and Z axes corresponding to the first size estimation 810 of FIG. 8A. Similarly, the object bounding box, the object minimum/maximum, and the object capsule basket size can correspond to the second size estimation 820, the third size estimation 830, and the fourth size estimation 840 of FIGS. 8B-8D, respectively.

The scene mesh can be a 3D reconstruction of the object, its surrounding scene, or both. In some implementations, the scene mesh may be represented in a file format used to store three-dimensional geometric data, such as the "*.ply" file format standing for Polygon File Format. Many variations are possible.

Example GUI

Figure 10:
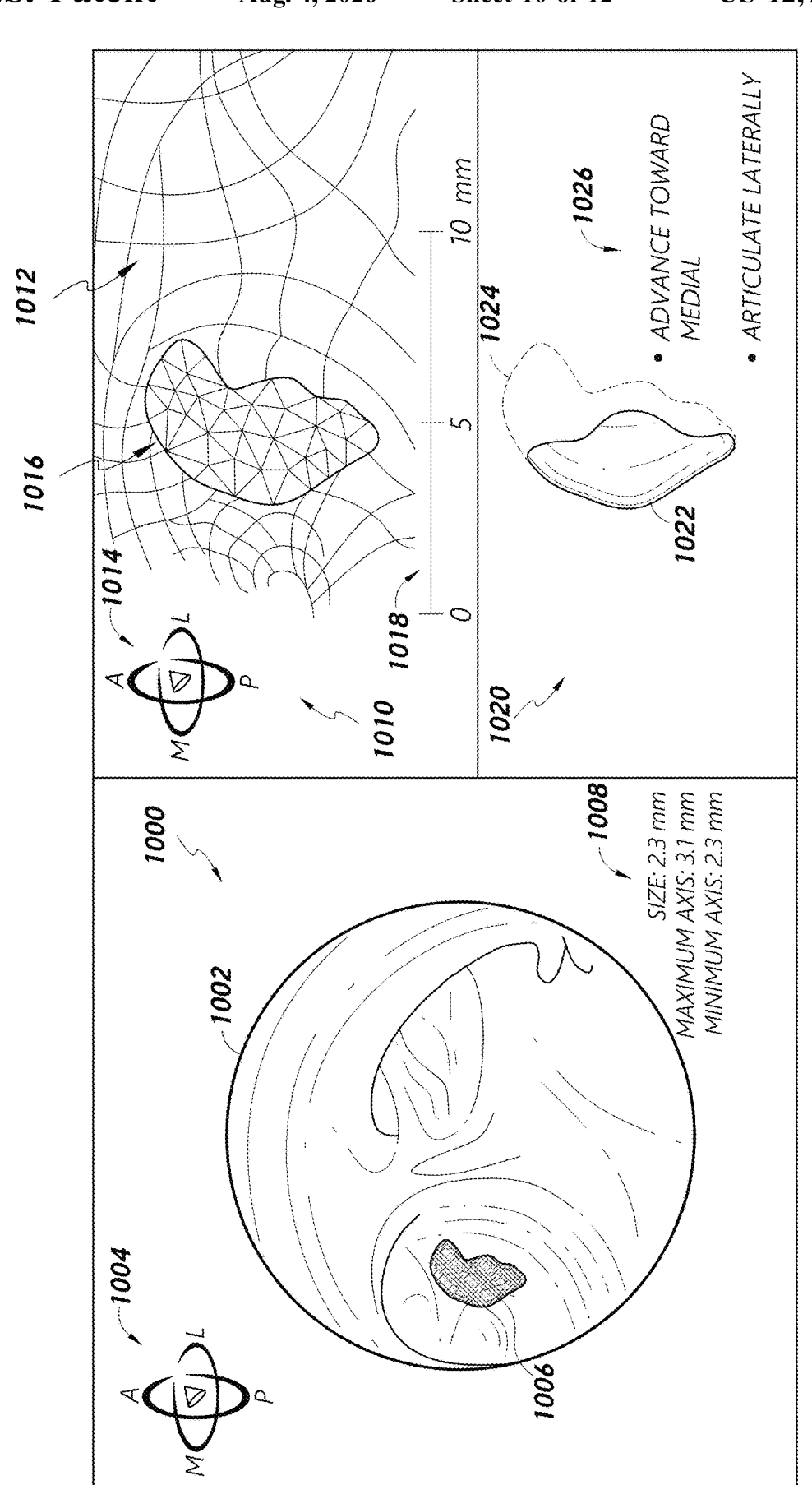
FIG. 10 illustrates an example graphical user interface (GUI) presenting real-time object sizing, in accordance with one or more embodiments.

FIG. 10 illustrates an example graphical user interface (GUI) presenting real-time object sizing, in accordance with one or more embodiments. The GUI can present various windows in relation to a medical procedure including an endoview 1002, a 3D reconstruction view 1010, a reconstruction instruction view 1020, or the like.

The endoview 1002 can present an endoluminal view from within a luminal network as captured by a distally positioned imaging sensor of an endoscope (e.g., the imaging device 348 positioned at the distal end 342 of the scope 340). The endoview 1002 can be fed from the imaging device to a display in real-time to assist the medical procedure in identifying an object (e.g., a kidney stone 1006) to be reconstructed in 3D. In some embodiments, an endoview compass 1004 or other navigation guidance may assist an operator in understanding orientation of the imaging device. The endoview 1002 may present one or more estimated size metrics 1008 to further assist the operator in understanding size of the object as determined based on various techniques of the present disclosure.

The 3D reconstruction view 1010 can present a 3D rendered object model 1016, a 3D rendered scene model 1012, or both. While the 3D rendered object model 1016 and the 3D rendered scene model 1012 are illustrated with polygons/meshes/contours, in some embodiments, textures may be applied to the models to render them in a realistic manner. The 3D reconstruction view 1010 may be zoomed, rotated, translated, or the like to assist an operator readily survey the object and the scene. Such interactions may be managed by the GUI manager 636 and reflected in a model compass 1014 and a model scale 1018.

The reconstruction instruction view 1020 can present current reconstruction progress and how to complete the reconstruction. For example, the reconstruction instruction view 1020 may present a reconstructed portion 1022 and missing portion 1024. To complete the 3D reconstruction, navigation instructions 1026 can prompt the operator to advance/retract/articulate the imaging sensor in certain ways to facilitate capturing additional viewpoints needed for the complete 3D reconstruction of the object. In some embodiments, the workflow manager 640 may be synchronized with the reconstruction instruction view 1020 to present the progress updates and navigation instructions 1026.

Data Collection Workflow

FIG. 11 illustrates a flow diagram illustrating a data collection process 1100 for collecting image data, in accordance with one or more embodiments. The process 1100, when followed, can streamline image data collection having varied viewpoints without redundancy (e.g., maximum variance with minimum count) where the collected image can provide 3D reconstruction of an object. In some implementations, the process 1100 can be the data collection protocol performed by the workflow manager 640 of FIG. 6. In some embodiments, the data collection process 1100 can involve controlling one or more imaging devices, for example for stereoscopic vision and/or infrared vision.

At block 1102, the process 1100 can involve advancing and retracting a distally positioned imaging sensor of an endoscope by known insertion and retraction amounts and capturing images. In some implementations, the amounts may be specified in the robotic frame, such as in millimeters or in some other units of control. In some implementations, the insertion and retraction amounts may be specified based on relative coverage of a view by the object. For example, the imaging sensor may be parked where approximately 50% of the view is covered by the object and capture a first image. The imaging sensor may be advanced to approximately 75% of the view coverage and capture a second image. The imaging sensor may be retracted to approximately 25% of the view coverage and capture a third image. The imaging sensor may be advanced back to 25-50% view coverage.

At block 1104, the process 1100 can involve articulating the imaging sensor to position the object in each quadrant and capturing images. That is, images may be captured at top-left, top-right, bottom-left, and bottom-right quadrants. The captured images can be fifth, sixth, seventh, and eighth images, for example, but any number of images may be captured.

At block 1106, the process can involve articulating the imaging sensor to the left and right and capturing images. The imaging sensor may be positioned at approximately 50% view coverage for the block 1106. During the articulation, each captured image may be evaluated for whether the object remains in a corresponding view.

At block 1108, the process can involve articulating the imaging sensor to the top and bottom followed by left and right and capturing images. The imaging sensor may be positioned at approximately 50% view coverage for the block 1108. During the articulation, each captured image may be evaluated for whether the object remains in a corresponding view.

It will be understood that the process 1100 is exemplary and the data collection protocol may include positioning the imaging sensor at fewer or more viewpoints and capturing corresponding images at the viewpoints. Furthermore, it will be understood that any portion of the process 1100 may need to be repeated or executed out of order (e.g., jumped to)

when evaluation of captured images reveal that the images do not satisfy one or more quality criteria (e.g., brightness, motion blurriness, shadow, occlusion, focus, etc.).

Object Sizing Workflow

FIG. 12 illustrates a flow diagram illustrating an object size estimation process 1200, in accordance with one or more embodiments. At block 1202, the process 1200 can involve accessing image data of images captured by an elongate body comprising an imaging sensor configured to capture the images of an object. The image data can be one or more image frames (e.g., video frames) of vision data captured by a distally positioned imaging sensor of an endoscope. In some embodiments, the image data can be obtained in real-time from the imaging sensor or from an image repository storing past captured image data.

At block 1204, the process 1200 can involve generating pose data corresponding to the image data, where pose data corresponds to viewpoints at which the images were captured. The pose data may include position data (e.g., the position data 404 of FIG. 4) and/or orientation data of the imaging sensor.

At block 1206, the process 1200 can involve reconstructing the object in 3D space based at least in part on the image data and the pose data. The reconstructed object can be rendered in 3D space as a 3D rendering.

At block 1208, the process 1200 can involve determining a scale to be applied to the 3D rendering. As described, the scale determination may involve comparing unitless visual odometry in virtual dimensions with a known trajectory having measurable physical dimensions.

At block 1210, the process 1200 can involve estimating size of the object based at least in part on the scale and the object reconstructed in the 3D space. Applying the scale can size the 3D rendering such that the 3D rendering can reflect a real world object having measurable physical dimensions. The sized 3D rendering can be surveyed for various characteristics/properties relating to the object's size and various size metrics may be estimated based on the characteristics/properties. As example characteristics/properties of the sized 3D rendering, shapes, curvatures, centroids, principal axes, local/global minima and maxima (e.g., most distal point from a centroid, etc.), or the like are contemplated. As example metrics of the sized 3D rendering, mass/weight, volume, density, size metrics described in relation to FIGS. 8A-8D, or the like are contemplated.

It is contemplated that the process 1200 may, in some instances, be executed online or in real-time, for example, to present an intraoperative size estimation. In other instances, the process 1200 may be executed offline to provide a postoperative size estimation during review.

Additional Embodiments

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes.

Conditional language used herein, such as, among others, "can," "could," "might," "may," "e.g.," and the like, unless specifically stated otherwise, or otherwise understood within the context as used, is intended in its ordinary sense and is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous, are used in their ordinary sense, and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is understood with the context as used in general to convey that an item, term, element, etc. may be either X, Y or Z. Thus, such conjunctive language is not generally intended to imply that certain embodiments require at least one of X, at least one of Y and at least one of Z to each be present.

It should be appreciated that in the above description of embodiments, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the inventions herein disclosed and claimed below should not be limited by the particular embodiments described above, but should be determined only by a fair reading of the claims that follow.

It should be understood that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to any other element, but rather may generally distinguish the element from another element having a similar or identical name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited.

Unless otherwise defined, all terms (including technical and scientific terms) used herein have the same meaning as commonly understood by one of ordinary skill in the art to which example embodiments belong. It be further understood that terms, such as those defined in commonly used dictionaries, should be interpreted as having a meaning that is consistent with their meaning in the context of the relevant art and not be interpreted in an idealized or overly formal sense unless expressly so defined herein.

The spatially relative terms "outer," "inner," "upper," "lower," "below," "above," "vertical," "horizontal," and similar terms, may be used herein for ease of description to describe the relations between one element or component and another element or component as illustrated in the drawings. It be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Unless otherwise expressly stated, comparative and/or quantitative terms, such as "less," "more," "greater," and the like, are intended to encompass the concepts of equality. For example, "less" can mean not only "less" in the strictest mathematical sense, but also, "less than or equal to."

What is claimed is:

1. A system for determining a property of an object, the system comprising:
    at least one non-transitory computer-readable memory having stored thereon executable instructions; and
    one or more processors in communication with the at least one non-transitory computer-readable memory and configured to execute the instructions to cause the system to:
    access a three-dimensional (3D) representation of the object;
    determine a first trajectory of an imaging device over a time period using photometric tracking;
    determine a second trajectory of a position sensor over the time period;
    determine a scale to be applied to the 3D representation based at least in part on the first trajectory and the second trajectory; and
    estimate the property of the object based at least in part on the scale and the 3D representation.

2. A system for generating a three-dimensional (3D) reconstruction of an object, the system comprising:
    an imaging device proximate a distal end of an elongate body, the imaging device configured to capture images of the object;
    a robotic system configured to control the elongate body; and
    control circuitry configured to:
    access image data of the images;
    generate depth maps from the image data;
    estimate a trajectory of the imaging device over time based at least in part on photometric tracking on the depth maps; and
    generate the 3D reconstruction of the object based at least in part on the image data and the trajectory.

3. A system for determining a property of an object, the system comprising:
    at least one non-transitory computer-readable memory having stored thereon executable instructions; and
    one or more processors in communication with the at least one non-transitory computer-readable memory and configured to execute the instructions to cause the system to:
    access image data of images of the object captured by an imaging device proximate a distal end of an elongate body;
    estimatE a trajectory of the imaging device over time based at least in part on identification of one or more features in a first image frame of the image data and corresponding features in a second frame of the image data subsequent to the first image frame;

generate a three-dimensional (3D) reconstruction of the object based at least in part on the image data and the estimating trajectory of the imaging device;

determine a scale to be applied to the 3D reconstruction; and based at least in part on the scale and the 3D reconstruction, estimate the property of the object.

4. The system of claim 3, wherein the property is a size property.

5. The system of claim 3, wherein the image data comprises image frames, and wherein generating the 3D reconstruction of the object comprises:

generating segmentation masks for the image frames.

6. The system of claim 3, wherein the estimating the trajectory of the imaging device comprises: generating a first segmentation mask for the first image frame and a second segmentation mask for the second image frame, the first segmentation mask including the one or more features and the second segmentation mask including the corresponding features; and tracking the one or more features and the corresponding features inside the segmentation masks.

7. The system of claim 3, further comprising:

generating depth maps from the image data, the trajectory of the imaging device further estimated based on photometric tracking on the depth maps.

8. The system of claim 7, wherein the photometric tracking is based at least in part on keyframe-based photometric error.

9. The system of claim 3, wherein generating the 3D reconstruction of the object comprises:

performing a volume fusion based at least in part on at least one of segmentation masks, depth maps, or an estimated trajectory of the imaging device over time; and generating a first 3D mesh of the object based at least in part on the segmentation masks.

10. The system of claim 9, wherein generating the 3D reconstruction of the object further comprises:

generating a second 3D mesh of a scene based at least in part on the estimated trajectory and the depth maps.

11. The system of claim 10, wherein the one or more processors is further configured to execute the instructions to cause the system to determine a relative movement between the first 3D mesh of the object and the second 3D mesh of the scene, wherein the relative movement indicates anatomical motion or scope motion.

12. The system of claim 9, wherein the volume fusion is based at least in part on at least one of a Truncated Signed Distance Field representation or surfel representation.

13. The system of claim 3, further comprising:

accessing electromagnetic (EM) data generated by an EM sensor proximate the distal end of the elongate body; and determining a transformation between corresponding coordinate frames of the EM sensor and the imaging device.

14. The system of claim 13, wherein determining the scale to be applied to the 3D reconstruction comprises:

determining a second trajectory of the EM sensor, the second trajectory in an EM sensor coordinates;

and determining the scale based at least in part on the estimated trajectory, the second trajectory, and the transformation between the EM sensor and the imaging device.

15. The system of claim 3, wherein estimating the property of the object comprises:

generating a bounding geometry that encompasses 3D point clouds of the 3D reconstruction; and multiplying the bounding geometry with the scale to determine object dimensions.

16. The system of claim 15, wherein the bounding geometry is an ellipsoid and the object dimensions are represented in minimum volume covering the ellipsoid.

17. The system of claim 3, wherein estimating the property of the object comprises:

determining two pixels having the farthest distance apart in an image frame of the image data;

tracking the two pixels in at least one subsequent image frame following the image frame;

performing triangulation to determine a 3D distance corresponding to the two pixels; and determining the maximum dimension of the object.

18. The system of claim 3, further comprising:

estimating poses corresponding to the images based at least in part on a kinematic model and robot data, the 3D reconstruction of the object further generated based on the estimated poses.

19. The system of claim 3, wherein the object is at least one of a kidney stone, a medical tool, or an anatomical feature.

*    *    *    *    *